United States Patent [19]
Tang et al.

[11] Patent Number: 6,066,272
[45] Date of Patent: May 23, 2000

[54] FULLERENE-CONTAINING OPTICAL MATERIALS WITH NOVEL LIGHT TRANSMISSION CHARACTERISTICS

[75] Inventors: Ben-zhong Tang, Kln; Nai-teng Yu, Clear Water Bay; Han Peng, Kln; Shuk-mei Leung, Kln; Xuan-zheng Wu, Kln, all of The Hong Kong Special Administrative Region of the People's Republic of China

[73] Assignee: The Hong Kong University of Science & Technology, The Hong Kong Special Administrative Region of the People's Republic of China

[21] Appl. No.: 08/729,724

[22] Filed: Oct. 7, 1996

[51] Int. Cl.[7] ............................... G02C 7/11; C08K 5/01
[52] U.S. Cl. ........................ 252/582; 252/583; 252/25; 525/25
[58] Field of Search .................... 528/25; 252/582

[56] References Cited

U.S. PATENT DOCUMENTS

| | | |
|---|---|---|
| 4,643,537 | 2/1987 | Vance . |
| 5,178,980 | 1/1993 | Mort et al. ............................. 430/58 |
| 5,235,358 | 8/1993 | Mutzhas et al. . |
| 5,281,653 | 1/1994 | Thomann et al. .................. 524/490 |
| 5,292,444 | 3/1994 | Patil et al. ........................... 252/50 |
| 5,386,048 | 1/1995 | West et al. ......................... 556/430 |
| 5,420,081 | 5/1995 | Mattes et al. ....................... 501/12 |
| 5,462,680 | 10/1995 | Brois et al. .......................... 252/9 |

FOREIGN PATENT DOCUMENTS

| | | |
|---|---|---|
| 0311290A2 | 4/1989 | European Pat. Off. . |
| WO 88/0287 | 4/1988 | WIPO . |

*Primary Examiner*—Peter F. Kulkosky
*Attorney, Agent, or Firm*—Burns, Doane, Swecker & Mathis, L.L.P.

[57] ABSTRACT

Optical glasses and polymers are described that incorporate homogeneously dispersed fullerene molecules. The resultant materials may be used as optical filters, the cut-off frequency being easily adjustable by changing the fullerene content. To prepare glasses fullerene molecules are firstly functionalized by amination prior to being incorporated into a sol-gel process to prepare the glass. To prepare polymers a pre-existing polymer may be subject to fullerenation, or fullerene may be copolymerized with a selected monomer.

7 Claims, 18 Drawing Sheets

H NMR spectrum of $H_xC_{60}[NH(CH_2)_6OH]_x$ in chloroform-d/DMSO-$d_6$ at room temperature.

Transmission spectra of ethanol solutions of $H_xC_{60}[NH(CH_2)_6OH]$ measured at room teemperature using a 1-cm square quartz cell. Spectra in (A) are plotted in a linear scale while (B) in a semilogarithmic scale.

Solvent effect on cut-off wavelength of
$H_XC_{60}[NH(CH_2)_6OH]_X$ solutions.

Transmission spectra of EtOH solutions of
(A) $H_xC_{60}[NH(CH_2)_3Si(OEt)_3]_x$ and
(B) $H_xC_{60}(NH\text{-}cyclo\text{-}C_6H_{11})_x$ (measured at room temperature using a 1-cm square quartz cell).

Concentration dependence of cut-off wavelength of $H_XC_{60}(NHR)_X$ solutions.

Cut-off wavelengths of ethanol solutions of
$H_XC_{60}(NH\text{-}cyclo\text{-}C_6H_{11})$ x measured on different days
at different concentrations (mg/ml): (1) 12.984,
(2) 6.492, (3) 3.246, (4) 1.623, (5) 0.811, (6) 0.406, (7) 0.203.

Transmission spectra of THF solutions of poly($C_{60}$-co-MMA) ($C_{60}$ content: 0.97 wt%) measured at room temperature using a 1-cm square quartz cell).

Concentration dependence of THF solutions of
(A) poly($C_{60}$-co-MMA) and (B) poly($C_{60}$-co-styrene)
with different $C_{60}$ contents.

Concentration dependence of THF solutions of $C_{60}$-containing polycarbonates prepared by (12A) AIBN-induced, (12B) UV-induced, and (12C) AlCl$_3$-catalyzed fullerenations.

Concentration dependence of cut-off wavelength of THF solutions of $C_{60}$-containing poly(vinyl chloride)s prepared by AIBN-induced fullerenation.

Transmission spectra of $C_{60}$-CR-39 copolymer films (measured at room temperature).

Concentration and pathlength (thickness) dependence of cut-off wavelength of (A) $C_{60}$-CR-39 and (B) $C_{60}$-styrene copolymer films.

Concentration and pathlength (thickness) dependence of cut-off wavelength of $H_xC_{60}[NH(CH_2)_3SiO_{2/3}]-SiO_2$ sol-gel glasses prepared in the presence of different drying-control chemical additives (DCCA). HEMA: 2-hydroxyethyl methacrylate (+ 1 mol % AIBN); PTMS: propyltrimethoxysilane.

Concentration and pathlength (thickness) dependence of cut-off wavelength of (A) $H_xC_{60}[NH(CH_2)_6OH]_x/SiO_2$ and (B) $H_xC_{60}(NH\text{-}cyclo\text{-}C_6H_{11})_x/SiO_2$ sol-gel glasses prepared in the presence or absence of drying-control chemical additives (DCCA). HEMA: 2-hydroxyethyl methacrylate (+ 1 mol %AIBN); PTMS: propyltriethoxysilane

FULLERENE-CONTAINING OPTICAL MATERIALS WITH NOVEL LIGHT TRANSMISSION CHARACTERISTICS

FIELD OF THE INVENTION

This invention relates to optical materials suitable for use as filters, and in particular to such materials incorporating fullerenes.

BACKGROUND OF THE INVENTION

Optical materials with filtering characteristics have many applications. One of the most obvious is to provide protection against the harmful effects of sunlight. The effects of excessive sunlight on the human body and eye are well known, and in addition exposure to strong sunlight can cause milk to degrade, beer to deteriorate and oil to become rancid. Over-exposure to sunlight is one of the major causes of opthalmic damage, including the formation of cataracts and tissue injury in the retina. Exposure of the body to sunlight can cause sunburn, erythema, skin cancer and premature ageing.

It is known that the damaging effect of light is wavelength dependant. Short wavelength (<400 nm) radiation induces photodegradation of many foods and beverages. Excessive exposure of the body to ultraviolet (UV) light promotes severe deterioration of the epidermis. UV light is also injurious to the eye, and strong blue and green light in the 400–550 nm range is harmful to visual performance. Light with a wavelength longer than 600 nm is generally harmless but can, under certain circumstances cause damage due to its thermal heating effect on the receptor segments in the retinal cells.

Another driving force for developing optical filter materials comes from technological development. Many modern technologies are based on photosensitive materials, for example photoresists for fabrication of integrated-circuit computer chips, photocurable polymer-dispersed liquid crystals for display systems, and colour films for photoimaging processes. Many pharmaceutical and medical products such as drugs, photocurable dental bonding resins, and polymer-based controlled drug delivery devices undergo undesirable photodegradation during storage. In addition many people such as welders, smelters, semi-conductor clean room operators, computer operators and laser operators need to be protected from prolonged exposure to strong and/or constant light emission.

PRIOR ART

Traditionally glass coloured with metal ions has been used to filter or cut off unwanted light. Although glass has been produced for thousands of years, the conventional technology for producing coloured cut-off glass consumes a tremendous amount of energy in a high-temperature process. The process is complex, involving batching, melting and forming steps in which a large amount (30–50 wt %) of many—normally 5 to 9—different kinds of components (eg metal oxides) have to be mixed with silica at high temperatures (several hundreds to thousands of degrees) with subsequent involved thermal post-treatments. Changing the cut-off wavelength of such a glass is not a trivial task: the components and their ratios and all the processing conditions must be carefully changed.

Because plastic offers various advantages, including low cost, low density, high flexibility, and high impact strength, it is rapidly replacing glass in many applications. The most commonly used methods for producing light-filtering plastics are the hot- or cold-dip dyeing processes in which the optical plastics are immersed in the hot or cold dye solution for some time to allow the dye to penetrate into the plastic matrix. The dyeing is a physical blending process, however, and thus the dye content and distribution in the plastics may change with time when in use, thus causing problems in stability and reliability in their wavelength-blocking performance. In addition changing the cut-off wavelengths of optical plastics is not easy: different dyes and their combinations must be used, which sometimes results in the formation of very dark plastics.

The optical properties of fullerene containing materials have recently begun to be explored. For example fullerene containing materials are known to have optical limiting properties (see for example U.S. Pat. No. 5,172,278). Difficulties arise, however, when attempts are made to incorporate fullerene into glasses and optical plastics. Simple physical blending leads to inhomogeneous compositions due to phase separation problems while previous attempts to incorporate the fullerene at a molecular level have resulted in the fullerene structure being damaged.

SUMMARY OF THE INVENTION

According to the present invention there is provided an optical filtering material comprising fullerene molecules homogeneously dispersed within said material. The cut-off frequency of the filtering material may be easily selected by adjusting the fullerene content. The material may be a glass, a polymer material, a solution, a lotion, a cream or other forms.

In this specification the term "fullerene" means not only $C_{60}$ (buckminster-fullerene) but also the higher molecular weight fullerenes ($C_{70}$, $C_{84}$ . . . ) and also their derivatives.

In a first embodiment of the invention the material is a glass and said fullerene molecules are firstly functionalised by reaction before being incorporated into said glass in a sol-gel process. By functionalising the $C_{60}$ the fullerene may be made soluble in a solvent suitable for sol-gel processing (eg ethanol/water) thus enabling fullerene to be homogeneously dispersed in the resulting glass avoiding the problems of inhomogeneity that may occur when fullerene is incorporated by a simple process of physical blending. The reaction may be amination, hydroxylation, alkylation, or cycloaddition.

When the reaction is an amination reaction it may comprise reacting $C_{60}$ with an amine derivative such as a primary, secondary or tertiary amines, for example 6-amino-1-hexanol, cyclohexylamine, 2-(2-aminoethoxy)ethanol, ethanolaime or 3-aminopropyltriethoxysilane. In the subsequent sol-gel reaction a solution of the $C_{60}$-amine derivative (eg in ethanol) is reacted with a metal alkoxide such as tetraethylorthosilicate (TEOS). The speed of the gel formation may be controlled by the addition of a suitable drying-control chemical additive such as 2-hydroxyethyl methacrylate, propyltrimethoxysilane, 3-(trimethylsilyl) propyl methacrylate, glycerol, DMF, DMSO, or any other suitable high boiling point or viscous liquid.

In other embodiments the material is a polymer such as polycarbonate, poly(vinyl chloride), polystyrene, CR-39, poly(methyl methacrylate), poly(hydroxyethyl methacrylate), polyethylene, polypropylene, poly (norbornylene), polyalkynes, poly(dimethylsiloxane), poly (ethylene teraphthalate), nylons, polyurethanes, or their copolymers or mixtures. A number of different techniques may be employed including: acid-catalysed, photolysisinduced, and radical-initiated fullerenation of existing polymers; thermally induced copolymerisation; and preparation of a physically blended mix of polymer and $C_{60}$ followed by thermally induced fullerenation of the polymer.

The invention also extends to methods of manufacturing optical filtering materials. In particular the invention extends to a method of manufacturing an optical filtering glass comprising, functionalising $C_{60}$ by reaction and adding said functionalised $C_{60}$ to a sol-gel reaction process. The invention also extends to a method of manufacturing an optical filtering polymer comprising the step of fullerenation of a polymer to create a copolymer having fullerene chemically incorporated therein. The invention further extends to a method for the manufacture of an optical filter polymer comprising the copolymerisation of $C_{60}$ with a selected monomer.

BRIEF DESCRIPTION OF THE DRAWINGS

Some embodiments of the invention will now be described by way of example and with reference to the accompanying Figures, in which.

DETAILED DESCRIPTION OF PREFERRED EMBODIMENTS

Figure 1A:
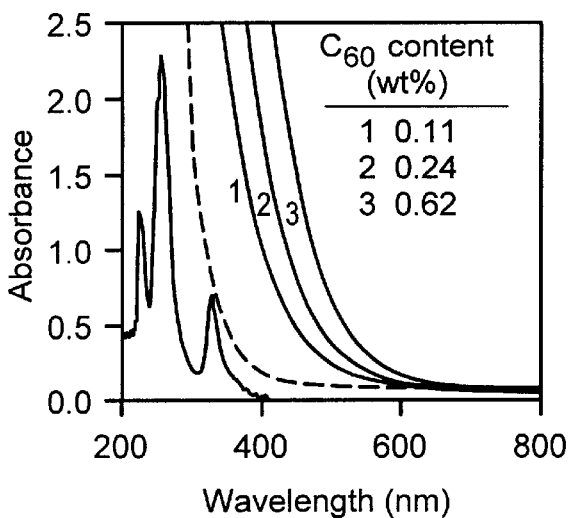
FIGS. 1(a)–(c) show the UV absorption spectra for certain sol-gel glasses prepared in accordance with embodiments of the invention.

In a first embodiment fullerenes may be incorporated into inorganic glasses by firstly functionalising the fullerenes by means of an amination reaction, followed by chemically incorporating the fullerenes into the glass by means of sol-gel processing.

Different $C_{60}$-amine derivatives were prepared using similar general procedures. The reaction was:

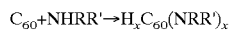

The fullerene and the amine compounds reacted in bulk under nitrogen at 100° C. for 24 hours. At the beginning fullerene particles were suspended in the amine compound but they gradually dissolved to form clear brown solution when the reaction proceeded. By checking using thin-layer chromatography using hexane as eluent, no unreacted fullerene was detected. The crude product was pre-treated to remove part of the unreacted amine compound. To further remove the amine compound the crude product was purified by either running silica-gel column or precipitation. The details for the synthesis of some $C_{60}$-amine derivatives are shown as follows:

EXAMPLE 1

Synthesis of $H_xC_{60}[NH(CH_2)_6OH]_x$ (1a)

A 25 ml flask was charged with 104 mg of $C_{60}$ and 2 g of 6-amino-1-hexanol. The content was gradually warmed to 100° C. and stirred for 24 hours under a dry nitrogen atmosphere. To remove the unreacted 6-amino-1-hexanol, the crude product was dissolved in a small amount (10 ml) of methanol which was then added dropwise into a large amount (500 ml) of acetonitrile under continuous stirring. The precipitate was filtered off by a Gooch crucible, washed with acetonitrile, and dried at room temperature. The isolated product was dissolved in methanol again, and further purified through a silica-gel column using methanol as an eluent. Brown powder (yield: 183 mg) was obtained.

EXAMPLE 2

Synthesis of $H_xC_{60}[NH\text{-cyclo-}C_6H_{11}]_x$ (1b)

A 25 ml flask was charged with 50 mg of $C_{60}$ and 2 ml of cyclohexylamine. After the reaction, part of the unreacted amine compound was removed by precipitating into acetonitrile. The crude product was purified by running silica gel column using methanol as eluent. Dark brown powder (yield: 78 mg) was obtained.

EXAMPLE 3

Synthesis of $H_xC_{60}[NH(CH_2CH_2O)_2H]_x$ (1c)

108 mg of $C_{60}$ and 2 ml of 2-(2-aminoethoxy)ethanol were added into a 25 ml flask. Again the mixture was heated at 100° C. under nitrogen for 24 hours. Purification of the product was achieved by precipitating into ca 400 ml of ethyl acetate. The precipitated product was filtered off using a Gooch crucible and dried at room temperature under vacuum. Dark brown powder (yield: 210 mg) was obtained.

EXAMPLE 4

Synthesis of $H_xC_{60}[NH(CH_2)_3Si(OEt)_3]_x$ (1d)

A 25 ml flask was charged with 108 mg of $C_{60}$ and 5 ml of 3-aminopropyltriethoxysilane. After the reaction proceeded for 24 hours the unreacted amine compound was distilled off from the reaction mixture under vacuum. Purification of the product was achieved by a silica-gel column using ethanol as an eluent. Dark brown solid (yield: 78 mg) was obtained.

Figure 4:
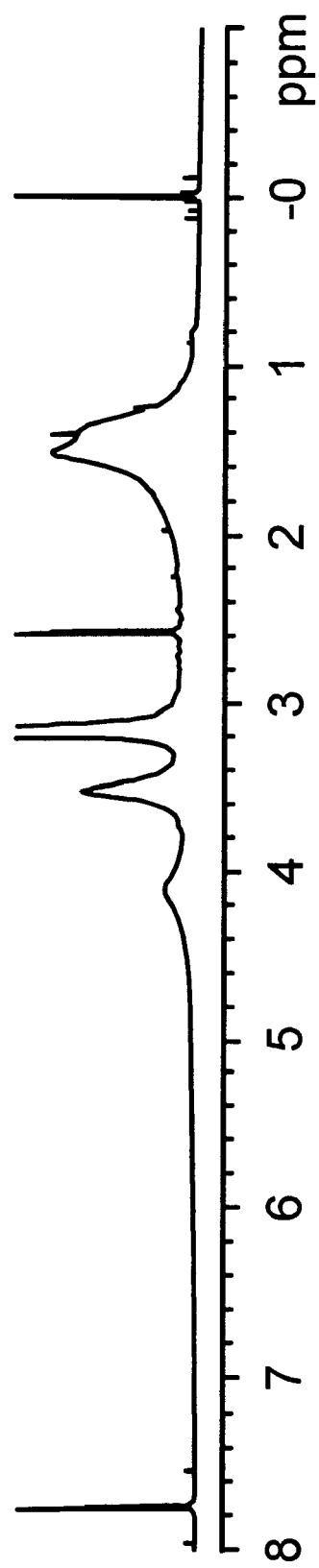
FIG. 4 is an $^1$H NMR spectrum of a $C_{60}$-amine derivative, FIGS. 5(a) and (b) are respectively linear and semilogarithmic plots of the transmission spectra of ethanol solutions of $H_xC_{60}[NH(CH_2)_6OH]_x$.

The chemical structure and composition of the $C_{60}$-amine derivatives may be fully characterized by spectroscopic analysis. FIG. 4 shows the $^1H$ NMR spectrum of $H_xC_{60}[NH(CH_2)_6OH]_x$. The addition of the amine compounds into fullerene is supported by the observation of a broad peak at δ(1H) 4.110 ppm which refers to C—H fullerene skeletal hydrogens. The $^1H$ NMR spectra for other $H_xC_{60}(NHR)_x$ also have this broad peak which confirms the structure of the $C_{60}$-amine derivatives see Table 1.

TABLE 1

$^1H$ NMR Data for $H_xC_{60}(NHR)_x$

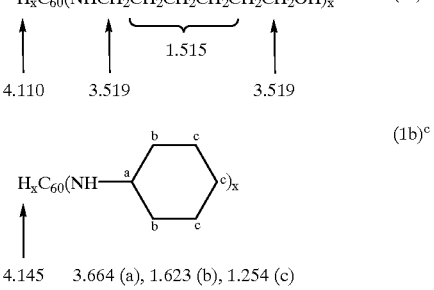

<sup>a</sup>Chemical shifts relative to TMS (ppm).
<sup>b</sup>In chloroform-d/DMSO-d<sub>6</sub>.
<sup>c</sup>In chloroform-d.
<sup>d</sup>In DMSO-d<sub>6</sub>.

The aminated fullerene derivatives obtained by Examples 1 to 4 above may be incorporated into glasses using a sol-gel process. Sol-gel processing is an attractive possibility for incorporating fullerene into a glass mainly due to the relatively low temperature at which a glass can be prepared. The sol-gel process, in general, involves three steps: (i) conversion of metal alkoxides to gels through hydrolysis and polycondensation reactions; (ii) drying of gels (gelation); and (iii) transformation of gels to glasses under elevated temperatures without melting. In the first step, the change of metal alkoxides to polymeric species through hydrolysis and condensation is as follows:

hydrolysis $$\equiv Si—OR + H_2O \rightarrow \equiv Si—OH + ROH$$

condensation $$\equiv Si—OR + HO—Si \equiv \rightarrow \equiv Si—O—Si + ROH \equiv Si—OH + HO—Si \equiv \rightarrow \equiv Si—O—Si \equiv + H_2O$$

In order to control the hydrolysis reaction an acid or base such as HCl or $NH_4OH$ is often employed as a catalyst. With HCl transparent high density dry gels consisting of small particles (<20 Å) are obtained, whereas with $NH_4OH$ opaline and low density dry gels are made. Several further factors, eg the concentration of the catalyst, the mole ratio between water and metal alkoxides, the nature of alkoxy groups on the silicon atom and the solvent, temperature etc. will all influence the gel structure.

It is also important to minimize drying stresses to avoid cracking in the glass during drying, and it is important to control pore size distributions and the rate of evaporation of the pore liquor which are factors leading to drying stresses. This can cause it to take a very long time to complete the drying step and produce a crack free glass. The addition of drying control chemical additives (DCCA) can alleviate this problem. DCCAs can reduce the gelation, ageing, drying times and drying stress, and can assist in the production of larger size monoliths.

Since the major components in a common sol-gel reaction system are tetraethylorthosilicate (TEOS), ethanol and water, the amination reaction makes $C_{60}$ TEOS-compatible and $EtOH/H_2O$-soluble so that a homogeneous and transparent glass can be obtained. The general process may be considered to be as follows. The sol-gel reaction is performed in a 25 ml 2-necked flask. Drying-control chemical additives (DCCA), either 2-hydroxyethyl methacrylate (HEMA), propyltrimethoxysilane (PTMS) or 3-(trimethylsilyl)propyl methacrylate (TMSPMA) may be added to control the gel formation. The mixture is heated at 60° C. for 1 hour under nitrogen. Part of the solvent is distilled off using an evaporator at 50° C. and the concentrated viscous sol solution was poured into a Petri dish which was then covered with parafilm. After two days a hole is made in the parafilm with a syringe needle to allow evaporation of the volatiles and the evaporation rate may be controlled by opening one more hole in the parafilm every three days. After the dish has been stored at room temperature for about 2 months a sol-gel glass is obtained.

Sol-gel glasses with different $C_{60}$ contents are prepared by changing the feed ratios of the derivative to tetraethyl orthosilicate (TEOS) in the sol-gel reaction mixture. The following examples describe the preparation of $C_{60}$ (for comparison) and $C_{60}$-amine derivative containing sol-gel glasses.

EXAMPLE 5

Preparation of Sol-gel Glasses with $C_{60}$

The reaction is as follows:

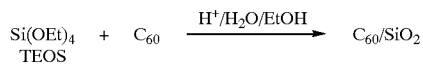

$$Si(OEt)_4 + C_{60} \xrightarrow{H^+/H_2O/EtOH} C_{60}/SiO_2$$
TEOS 1. 5 ml of TEOS and 1 ml of toluene were added into a degassed 25 ml two-necked flask. A pre-mixed solution consisting of 1.3 ml of water, 1.4 ml of ethanol, 1.5 ml of hydrochloric acid (HCl) (0.48M), and 2.5 ml of 0.01% toluene solution of $C_{60}$ were transferred to the flask at room temperature. The mixture was then stirred at 60° C. under nitrogen for one hour. Allowing the solvent to evaporate gradually a pale yellow-coloured $C_{60}$—$SiO_2$ glass with big black particles was obtained after three months.

2. A drying control chemical additive such as 2-hydroxyethyl methacrylate (HEMA) may also be used.

2.8 mg of 2,2'-azobis(2-methylpropionitrile), (AIBN) was added into a 25 ml two-necked flask. The system was degassed by nitrogen for three times. Then 5 ml of TEOS and 0.15 ml of 2-hydroxyethyl methacrylate (HEMA) was added. A pre-mixed solution consisting of 1.3 ml of water, 1.4 ml of ethanol, 1.5 ml of HCl (0.48M), and 1 ml of 0.01% toluene solution of $C_{60}$ were transferred to the flask at room temperature. The mixture was then stirred at 60° C. under nitrogen for 1 hour. Allowing the solvent to evaporate gradually a pale yellow coloured $C_{60}$—$SiO_2$ with small black particles (thickness: 1.75 mm) was obtained after two months.

3. An alternative DCCA such as propyltrimethoxysilane (PTMS) may also be used.

A 25 ml two-necked flask was degassed by nitrogen three times. 7 ml of TEOS, 0.28 ml of PTMS and 1 ml of toluene were added. A pre-mixed solution consisting of 1.7 ml of water, 1.9 ml of ethanol, 2 ml of HCl (0.48M), 1 ml of 0.01% toluene solution of $C_{60}$, and 1 drop of glycerol were transferred to the flask at room temperature. The mixture was then stirred at 60° C. under nitrogen for 1 hour. By carefully controlling the solvent evaporation rate, a pale yellow-coloured $C_{60}$—$SiO_2$ with small black particles (thickness: 1.75 mm) was obtained after two months.

EXAMPLE 6

Preparation of Sol-gel Glasses (2a) Containing (1a)

The reaction is as follows:

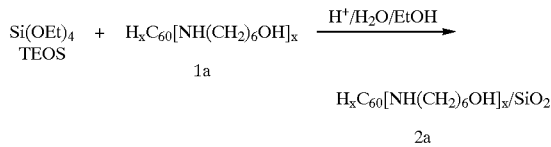

1. The sol-gel glass was prepared using the same procedure as in Example 5.1 except that a premixed solution consisting of 1.3 ml of water, 1.4 ml of ethanol, 1.5 ml of HCl (0.48M) and 0.3 ml of ethanol solution of 1a (11.456 mg/ml) were added. In addition no toluene was used. A transparent brown-coloured monolith 2a with a thickness of 1.78 mm was obtained after two months.

2. Using HEMA as DCCA a sol-gel glass was prepared using the same procedure as in Example 5.2 except that a pre-mixed solution consisting of 1.3 ml of water, 1.4 ml of ethanol, 1.5 ml of HCl (0.48M), and 0.2 ml of ethanol solution of 1a (11.456 mg/ml) were added. In addition no toluene was used. A transparent brown-coloured monolith 2a with a thickness of 1.79 mm was obtained after two months.

3. Using TMSPMA as DCCA 6 mg of AIBN was added into a 25 ml two-necked flask. The system was degassed by nitrogen three times. 5 ml of TEOS and 0.2 ml of 3-(trimethylsilyl)propyl methacrylate (TMSPMA) were added. A premixed solution consisting of 1 ml of water, 1.4 ml of ethanol, 1.5 ml of HCl (0.48M), and 0.3 ml of ethanol solution of 1a (3.104 mg/ml) were transferred to the flask. The mixture was then stirred at 60° C. under nitrogen for one hour. Carefully controlling the solvent evaporation yielded a transparent brown-coloured monolith 2a with a thickness of 1.85 mm after two months.

EXAMPLE 7

Preparation of Sol-gel Glasses (2b) Containing (1b)

The reaction is as follows:

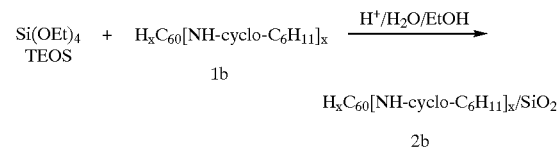

The preparation procedures were the same as in Example 5.1 except for the addition of 0.3 ml of ethanol solution of 1b instead of 0.01% toluene solution of $C_{60}$. Besides that, no toluene was added. A transparent brown-coloured monolith 2b with a thickness of 1.42 mm was obtained after two months.

EXAMPLE 8

Preparation of Sol-gel Glasses (2d) Containing (1d)

The reaction is:

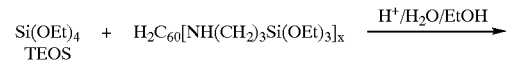

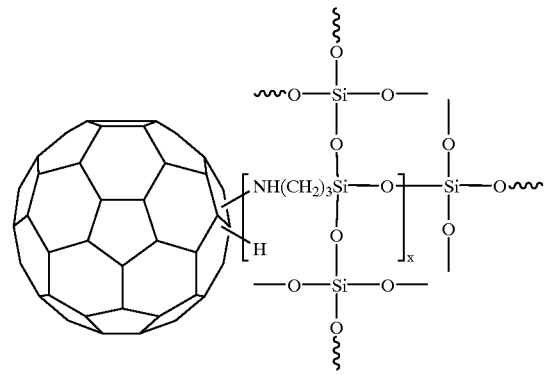

1. The sol-gel glass was prepared using the same procedures as in Example 5.2 except that 0.1 ml of ethanol solution of 1d (11.8 mg/ml) was added instead of 0.01% toluene solution of $C_{60}$. Also no toluene was added. A transparent brown-coloured monolith 2d with a thickness of 1.64 mm was obtained after two months.

2. The sol-gel glass was prepared using the same procedure as in Example 5.3 except for the addition of 0.05 ml of ethanol solution of 1d (11.8 mg/ml) instead of 0.01% toluene solution of $C_{60}$. Also no toluene was added. A transparent brown-coloured monolith 2d with a thickness of 1.81 mm was obtained after two months.

Analysis of the sol-gel glasses produced by Examples 5 to 8 revealed that for the $C_{60}/SiO_2$ glasses numerous aggregated fullerene clusters were suspended within the $SiO_2$ matrix, even for very low fullerene content (ca 0.0097%). On the other hand sol-gel glasses prepared with aminated fullerene derivatives were homogeneous and transparent. No aggregated clusters or separated "islands" were observed in these glasses, although their fullerene contents (ca 0.55%) were much higher.

Figure 1B:
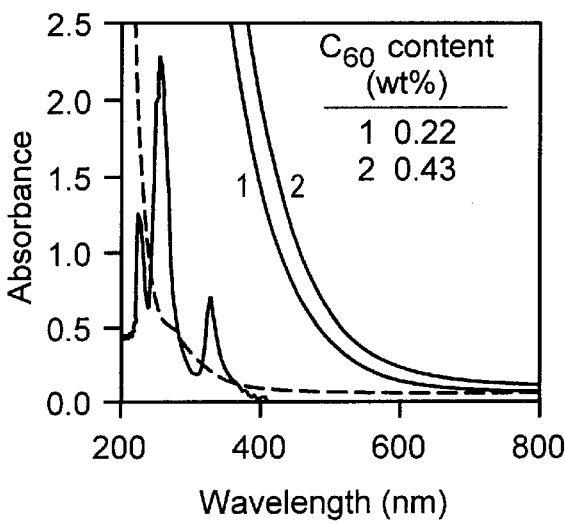
Figure 1C:
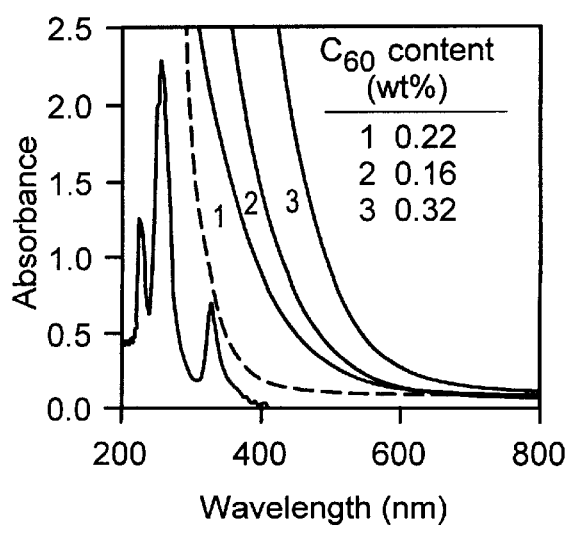

FIGS. 1(a)–(c) show the UV spectra (recorded using a Milton Roy Spectronic 3000 Array Spectrometer) for sol-gel glasses 2a, 2b, 2d respectively. For comparison the UV spectra of $C_{60}$ (thin solid line) and "pure" $C_{60}$-containing sol-gel glasses (dotted line—Example 5.2 for FIG. 1(a) & (c), Example 5.3 for FIG. 1(b)) are also shown. FIGS. 1(a)–(c) show that the absorption spectra of sol-gel glasses containing aminated fullerenes are completely structureless in comparison to free fullerene. In addition the absorption spectra are red-shifted relative to that of pure fullerene containing sol-gel glasses. The degree of red-shift is dependent on the fullerene content (a greater red-shift for greater fullerene content) which means that the cut-off frequency can be controlled by appropriate selection of the fullerene content. Furthermore the fullerene-derivative containing glasses were homogeneous, thermally stable, optically transparent and crack free. The monoliths obtained were all with a diameter of 28–30 mm and a thickness of 1.22 to 2.01 mm.

The above Examples illustrate the preparation of glasses incorporating functionalised fullerenes to provide glasses having desirable optical properties. However, given the increasing use of optical plastics the creation of fullerene containing optical plastics materials with similar properties would clearly be desirable.

EXAMPLE 9

Acid-catalyzed Fullerenation of Polycarbonate

A baked 50 ml two-necked pear-shaped flask was charged with 508.2 mg of polycarbonate (PC) and 5 mg of $C_{60}$. Then 15 ml of 1,1,2,2-tetrachloroethane ($CHCl_2CHCl_2$) was added. After PC and $C_{60}$ completely dissolved the whole system was degassed three times by nitrogen. $PC/C_{60}$ solution was transferred into a saturated solution of aluminium chloride ($AlCl_3$) under room temperature and then the mixture was heated at 140° C. under nitrogen. After ca. 30 minutes the purple solution gradually changed to a brown solution. After 24 hours a little amount of polymer solution was precipitated in 5 ml of hexane. The hexane solution was filtered through cotton wool. Evaporating the filtrate solution, redissolving particles (if any) in 1 ml of toluene, and checking the toluene solution by UV measurement indicating that there is no unreacted $C_{60}$ left. Then the reaction was quenched by the addition of a few drops of water. The whole reaction mixture was transferred to a separation funnel and washed with 15 ml of water for three times to remove residual catalyst $AlCl_3$. The organic layer was collected, dried over anhydrous sodium sulphate and evaporated to yield a brown solid. The brown solid redissolved in ca. 20 ml of THF and the solution was added dropwise through cotton wool to 1 liter of hexane. The precipitated polymer was filtered off using a Gooch crucible and dried at room temperature under vacuum for 2 days. Brown solid (yield: 97.2%) was obtained. $C_{60}$-PC polymers with other $C_{60}$ contents were prepared similarly by changing the initial feed ratios.

EXAMPLE 10

UV-induced Fullerenation of Polycarbonate 500.6 mg of polycarbonate (PC), 10.8 mg of $C_{60}$ and 10 ml $CHCl_2CHCl_2$ were added into a round-bottomed flask. After all PC and $C_{60}$ particles were completely dissolved, 7 ml solution mixture was transferred to a quartz tube and was degassed by nitrogen three times. The solution mixture with continuous stirring was irradiated with 200 W Hg lamp under nitrogen. The progress of the reaction was checked continuously by a similar method to the one set out in Example 9. After 35 hours it was found that there was no unreacted $C_{60}$ and the whole reaction mixture was added dropwise through cotton wool to ca. 1 liter hexane. The precipitated copolymer was filtered off using a Gooch crucible and dried at room temperature under vacuum for 2 days. Brown solid (yield: 92.6%) was obtained. $C_{60}$-PC polymers with other $C_{60}$ contents may be prepared by appropriately changing the feed ratios.

EXAMPLE 11

AIBN-initiated Fullerenation of Polycarbonate

A 25 ml round-bottomed flask was charged with 506 mg of polycarbonate (PC) and 5 mg of $C_{60}$. Then 10 ml of $CHCl_2CHCl_2$ was added to the flask. After the PC and $C_{60}$ had completely dissolved, 5.6 mg of 2,2'-azobisisobutyronitrile (AIBN) was added and then the whole reaction mixture was degassed by nitrogen for three times. Stirring at 60° C. under nitrogen for about one hour changed the solution from purple to brown in colour. After 24 hours similar methods to those described in the previous examples were employed to establish that no $C_{60}$ was unreacted. Then the reaction mixture was added dropwise through cotton wool to 1 liter hexane. The precipitated crude product was filtered off using a Gooch crucible and dried at room temperature under vacuum for one day. Brown solid was redissolved in ca. 10 ml of THF and the brown solution was precipitated through cotton wool to about 1 liter of methanol under stirring. Repeated precipitation of polymer in hexane and methanol was done until the $C_{60}$-AIBN adducts were removed which was indicated by a GPC (gel-permeation chromatography) chromatogram. The precipitated polymer was filtered off using a Gooch crucible and dried at room temperature under vacuum for two days. Brown solid (yield: 94.0%) was obtained. $C_{60}$-PC polymers with other $C_{60}$ contents can be prepared in similar manner by changing the initial feed ratio.

EXAMPLE 12

AIBN-initiated Fullerenation of Poly(vinyl Chloride)

A 25 ml round-bottomed flask was charged with 506 mg of poly(vinylchloride) (PVC) and 5 mg of $C_{60}$. Then 18 ml of chlorobenzene was added to the flask. After the PVC and $C_{60}$ completely dissolved, 22.8 mg of AIBN was added. The reaction mixture was stirred at 60° C. under nitrogen for 24 hours and the crude product was obtained. After subsequent purification as described in the previous Example brown solid (yield: 83.9%) was obtained. $C_{60}$-PVC polymers with other $C_{60}$ contents can be obtained by changing the initial feed ratio.

EXAMPLE 13

Preparation of $C_{60}$-CR-39 Copolymer Films 0.6 mg of $C_{60}$ and 82.6 mg of AIBN were added into a 25 ml two-necked round-bottomed flask. The whole system was degassed by nitrogen three times. Then 4 ml of di(ethylene glycol)bis(allyl carbonate) (CR-39) was added and the reaction mixture heated at 60° C. under nitrogen. $C_{60}$ particles were gradually dissolved to form a clear pale brown solution. After 12 hours a similar method to those previously described was used to confirm that no unreacted $C_{60}$ remained. Then the whole product solution was filtered through cotton wool. No particles were left on the cotton wool indicating that no insoluble polymers were formed during the polymerisation. Pouring the polymer solution onto a glass plate, heating at 60° C. for 2 hours and 80° C. for 24 hours yielded a pale brown membrane with a thickness of 455 μm. $C_{60}$-CR-39 crosslinked copolymers with other $C_{60}$ contents can be made by changing the initial feed ratios.

EXAMPLE 14

Copolymerisation of $C_{60}$ with Methyl Methacrylate 16.4 mg of $C_{60}$, 46.3 mg of AIBN, and 4.8 ml of methyl methacrylate (MMA) were added into a baked 25 mm round-bottomed flask. Stirring the reaction mixture at 70° C. under nitrogen for 24 hours yielded a brown crude product. After purification and filtering using the previously described techniques brown solid (yield:53.7%) was obtained. $C_{60}$-MMA copolymers with other $C_{60}$ contents can be manufactured by changing the initial feed ratios.

EXAMPLE 15

Copolymerisation of $C_{60}$ with Styrene 20 mg of $CO_{60}$, 25 mg of 2,2'-azobisisobutyronitrle (AIBN), and 4.8 ml of styrene were added into a baked 25 ml round-bottomed flask. After the reaction and then subsequent purification as previously described, a brown solid (yield:55.7%) was obtained. $C_{60}$-styrene copolymers with other $C_{60}$ contents can be manufactured by changing the initial feed ratios.

FIGS. 2(a)–(c) and FIGS. 3(a)–(d) illustrate the UV spectra of various $C_{60}$ containing polymers.

Figure 2A:
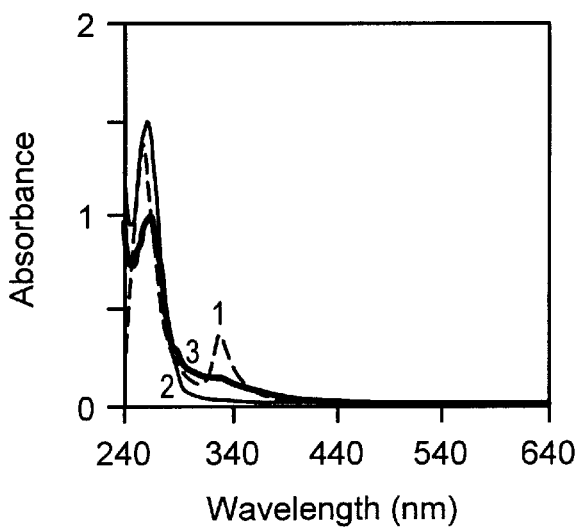
FIGS. 2(a)–(c) show the UV absorption spectra for certain optical polymers prepared in accordance with embodiments of this invention.
Figure 2B:
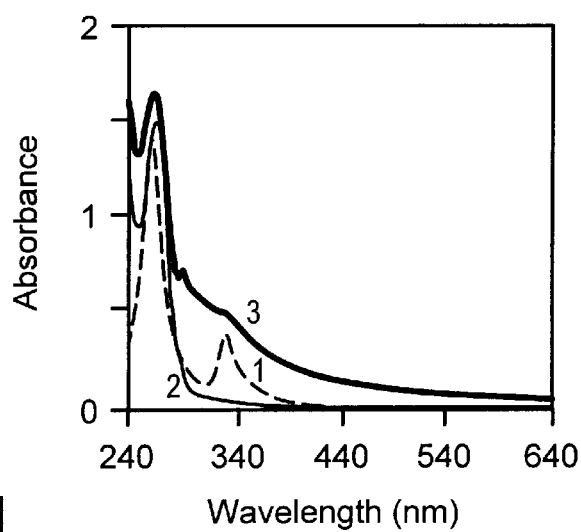
Figure 2C:
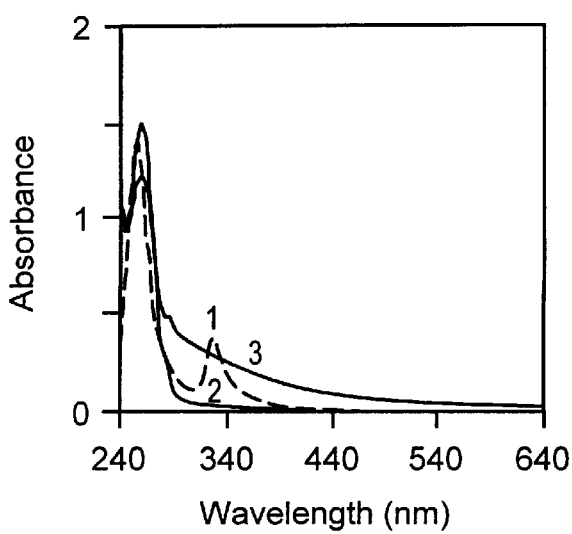

In FIGS. 2(a)–(c) each figure shows the spectra of (1) $C_{60}$, (2) polycarbonate (PC), and (3) $C_{60}$-containing PC prepared by fullerenation induced by $AlCl_3$ catalyst (FIG. 2(a)), UV irradiation (FIG. 2(b)), and AIBN initiation (FIG. 2(c)). The $C_{60}$ content (wt %) was 2.28% (FIG. 2(a)), 5.76% (FIG. 2(b)), and 6.30% (FIG. 2(c)). The concentration (mg/ml) of $C_{60}$ in FIGS. 2(a)–(c) was 0.011; concentration of PC/THF in FIGS. 2(a)–(c) was 0.475; and the concentration of $C_{60}$-PC/THF was 0.25 (FIG. 2(a)), 0.3 (FIG. 2(b)), and 0.275 (FIG. 2(c)).

Figure 3A:
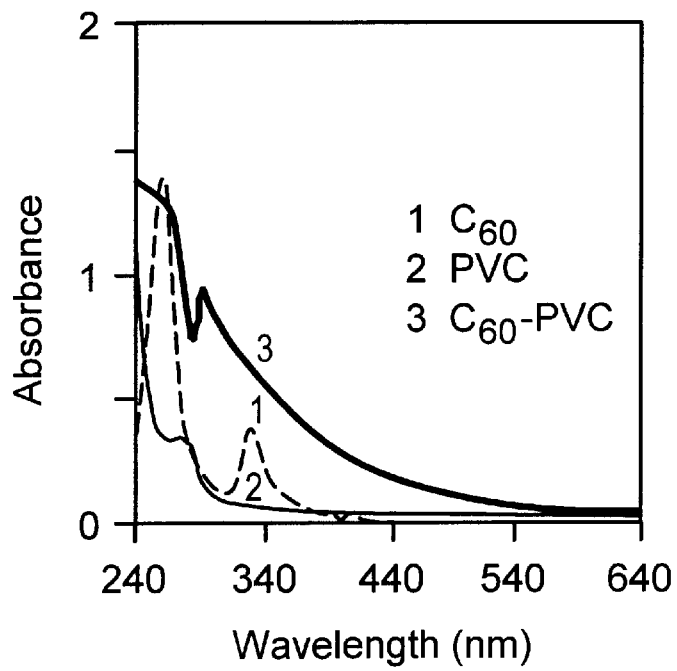
FIGS. 3(a)–(d) show the UV spectra for still further optical polymers prepared in accordance with embodiments of this invention.

FIG. 3(a) compares UV absorption spectra for (1) $C_{60}$ (0.11 mg/ml $C_{60}$/hexane), (2) PVC (23.375 mg/ml PVC/THF), and (3) $C_{60}$-PVC (0.4 mg/ml $C_{60}$-PVC/THF, $C_{60}$ content 4.98 wt %).

Figure 3B:
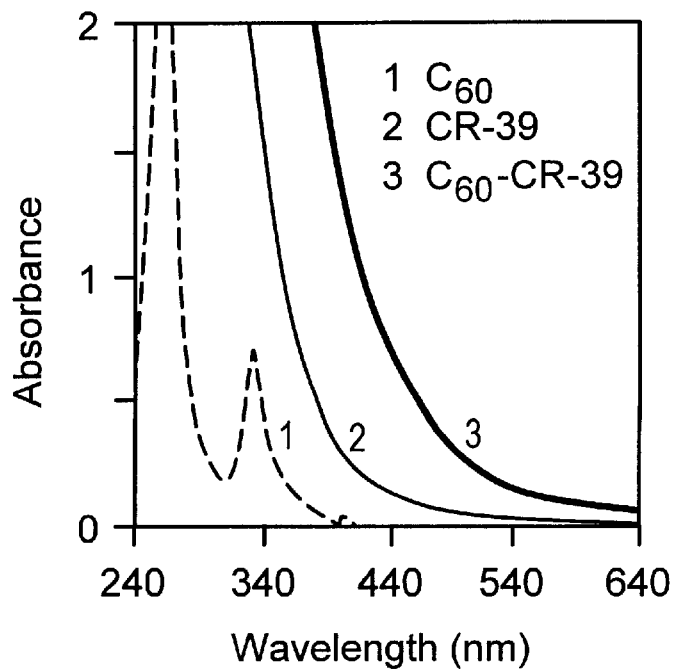

FIG. 3(b) compares UV absorption spectra for (1) $C_{60}$ (as for FIG. 3(a)), (2) CR-39 (455 μm film thickness) and (3) $C_{60}$-CR-39 (82 μm film thickness, $C_{60}$ content 0.22 wt %).

Figure 3C:
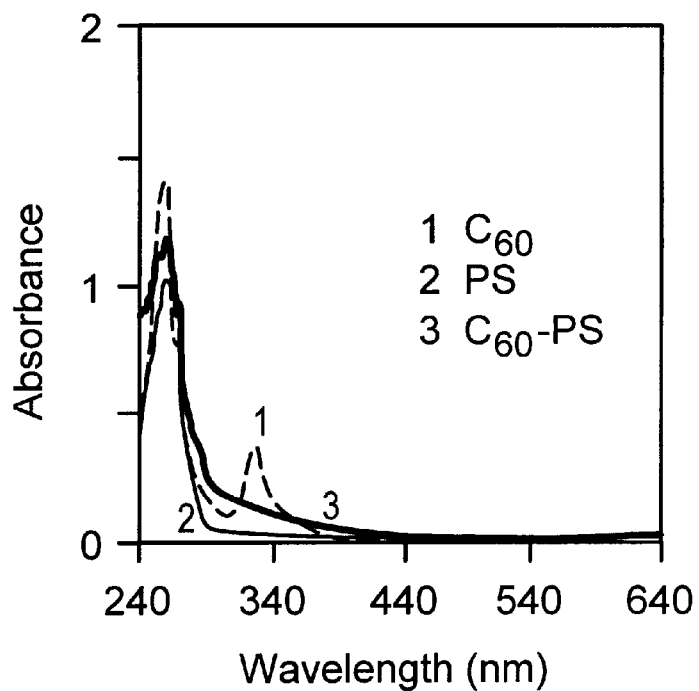

FIG. 3(c) compares UV spectra for (1) $C_{60}$ (as for FIG. 3(a)), (2) PS (0.45 mg/ml PS/THF), and (3) $C_{60}$-PS (0.45 mg/ml $C_{60}$-PS/THF, $C_{60}$ content 1.14 wt %).

Figure 3D:
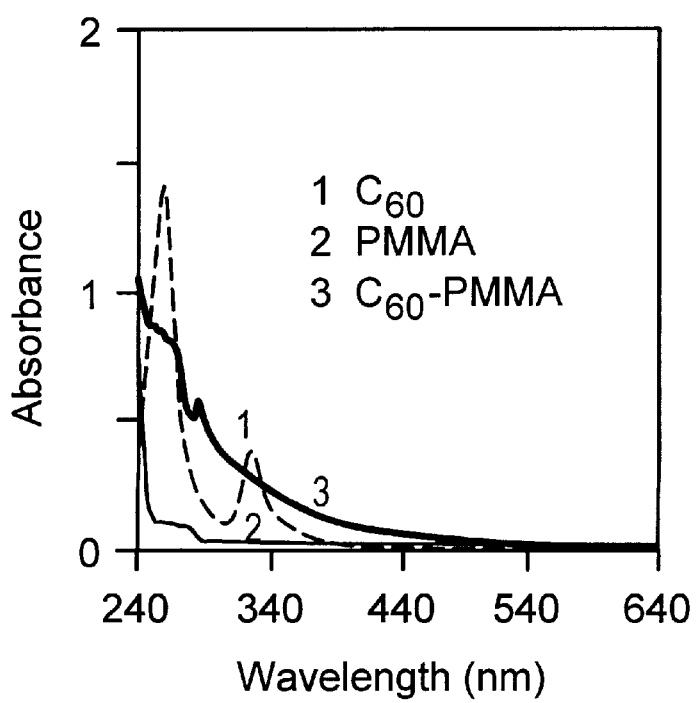

FIG. 3(d) compares UV spectra for (1) $C_{60}$ (as for FIG. 3(a)), (2) PMMA (4.075 mg/ml PMMA/THF) and (3) $C_{60}$-PMMA (0.85 mg/ml $C_{60}$-PMMA/THF, $C_{60}$ content 0.97 wt %).

These figures show that the absorption spectra in the visible region of the $C_{60}$ containing polymers are very different from both the free $C_{60}$ and the parent polymers. The characteristic absorption band of fullerene at 329 nm disappears and is replaced by a steadily decreasing absorbance curve toward a longer wavelength without any pronounced maxima which appears to be the tail of an intense absorption band in the UV region.

In addition to the above examples $C_{60}$-containing PMMA, PS, PC and PVC may be made by a process of thermal-induced fullerenation. In each case the process is very similar. Apart from PVC, a polymer membrane was obtained with physical blending of $C_{60}$ by adding polymer, $C_{60}$ and solvent to a 50 ml round-bottomed flask. After the polymer and $C_{60}$ were dissolved the solution was poured into a Petri dish. Allowing a slow rate of evaporation at room temperature yielded a polymer membrane with physically blended $C_{60}$.

The membrane was then further dried at room temperature under vacuum for one day and then cut into small pieces and transferred to a schlenk. The membrane is heated to about the temperature at which the polymer melts and after the reaction the resulting polymer is dissolved in THF and the solution precipitated dropwise through cotton wool into 1 liter hexane. The precipitated polymer was filtered off using a Gooch crucible and dried at room temperature under vacuum for 2 days.

EXAMPLE 16

Preparation of $C_{60}$-PMMA Polymer 518.2 mg of PMMA, 5.2 mg of $C_{60}$ and 10 ml toluene were used to prepare the $C_{60}$/PMMA membrane. Heating at 190° C. for 1 hour under nitrogen yielded brown solid. After precipitation and drying a dark brown fibre (yield: 88%) was obtained.

EXAMPLE 17

Preparation of $C_{60}$-PS Polymer 615 mg of PS, 6.2 mg of $C_{60}$ and 10 ml of toluene were used to prepare the $C_{60}$/PS membrane. Heating at 190° C. for 1 hour under nitrogen yielded brown solid. After precipitation and drying, a dark brown fibre (yield: 97%) was obtained.

EXAMPLE 18

Preparation of $C_{60}$-PC polymer 555.7 mg of PC, 5.5 mg of $C_{60}$ and 10 ml $CHCl_2CHCl_2$ were used to prepare the $C_{60}$/PC membrane. Heating the membrane at 340° C. for 45 minutes under nitrogen yielded brown solid. After precipitation and drying a dark brown fibre (yield:97%) was obtained.

EXAMPLE 19

Preparation of $C_{60}$-PVC Polymer 547.4 mg of PVC and 5.4 mg of $C_{60}$ were grinded thoroughly inside a pestle. Transferring the mixture to a schlenk and heating at 180° C. for 1 hour under nitrogen yielded brown solid. The resulting copolymer was dissolved in 10 ml of THF, and the solution was added dropwise through the cotton wool to about 10 ml of hexane. A small amount of black particles remained on the filter paper. The precipitated polymer was filtered off using a Gooch crucible and dried at room temperature under vacuum for 2 days. Dark brown fibre (yield:96%) was obtained.

The observations made with respect to the samples manufactured by the above Examples indicate UV filtering properties for the fullerene containing materials. Analysis of the UV spectra of further materials made by the above Examples confirms this. In the following UV spectra were recorded using a Milton Roy Spectronic 3000 Diode Array Spectrometer. For the samples in solution, the spectra were measured at room temperature using a 1 cm square quartz cell. Either ethanol, THF or DMSO was used as reference. Membranes and glasses were measured directly and a reference blank was used, in these cases the pathlength was the thickness of the membranes and the glasses respectively.

Figure 5A:
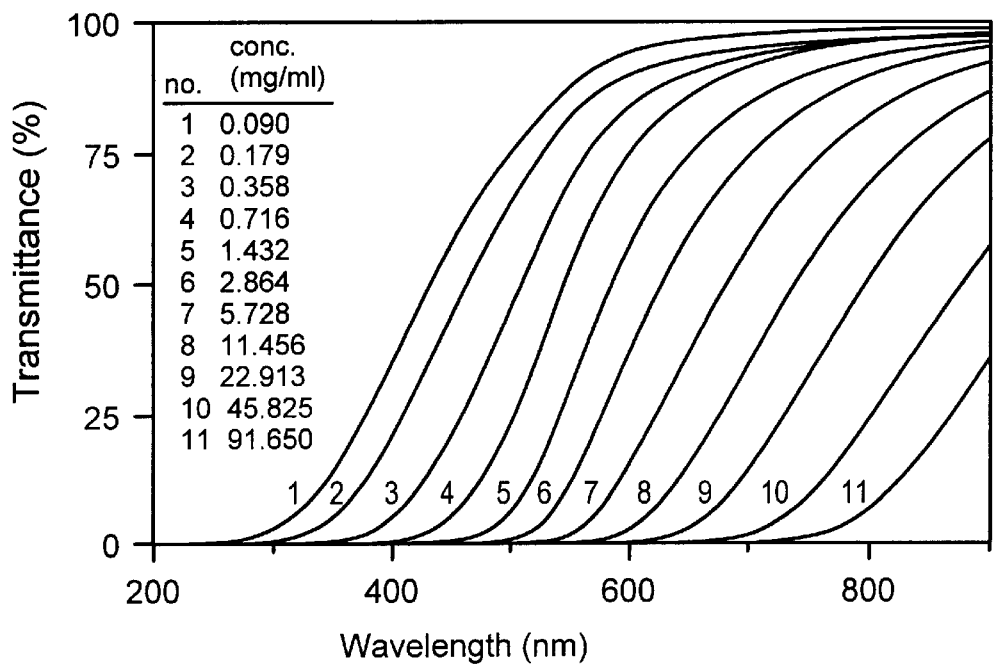
Figure 5B:
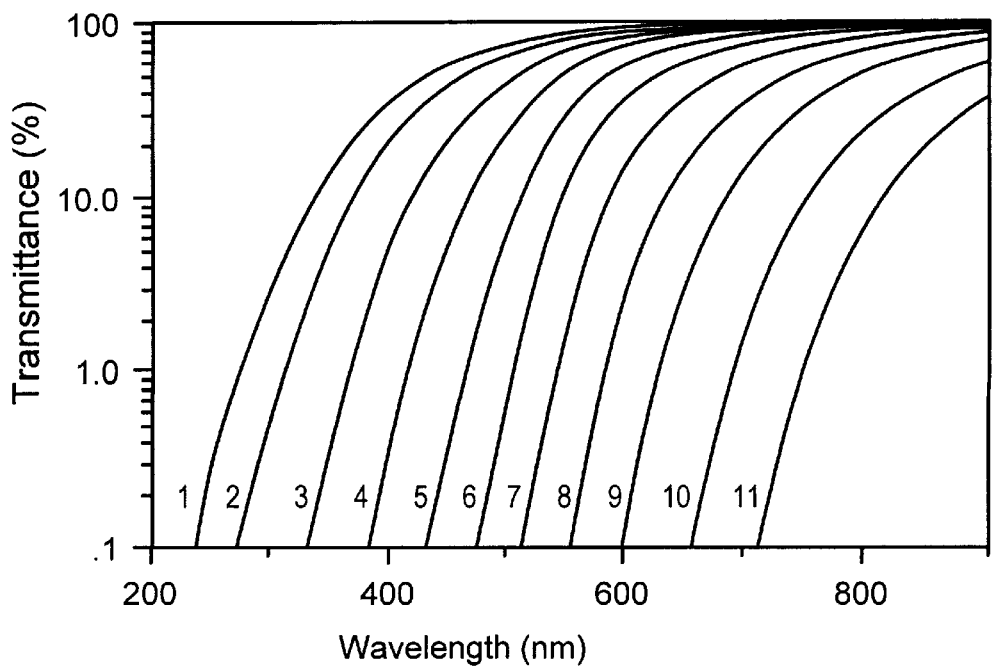

FIGS. 5(*a*) and (*b*) shows the optical transmission spectra of varying concentrations of ethanol solutions of a $C_{60}$ derivative, $H_xC_{60}[NH(CH_2)_6OH]_x$ plotted on linear and semilogarithmic scales respectively. While $C_{60}$ is virtually insoluble in lower alcohols, the aminated derivative is very soluble in ethanol and forms clear solutions at high concentrations.

As can be seen from FIGS. 5(*a*) & (*b*) the transmission spectra at all concentrations investigated are structureless in the manner of transmission curves for cut-off filters. However, unlike dyed filters no UV hole is observed in the 300–400 nm region. It should also be noted that as the concentration of the $C_{60}$ derivative increases the transmission spectrum is shifted to a longer wavelength with little change in shape.

The cut-off wavelength ($\lambda_c$) may be defined as the wavelength at which light transmittance is 0.1%. When the concentration of the aminated compound is 0.009%, $\lambda_c$ is located at 239.7 nm, which is in the beginning of the ultraviolet region. When the concentration reaches 9.165% $\lambda_c$ shifts to 713.3 nm which is near the infra-red region. Thus varying the concentration of the aminated compound allows the cut-off wavelength to be simply adjusted at will.

Figure 6:
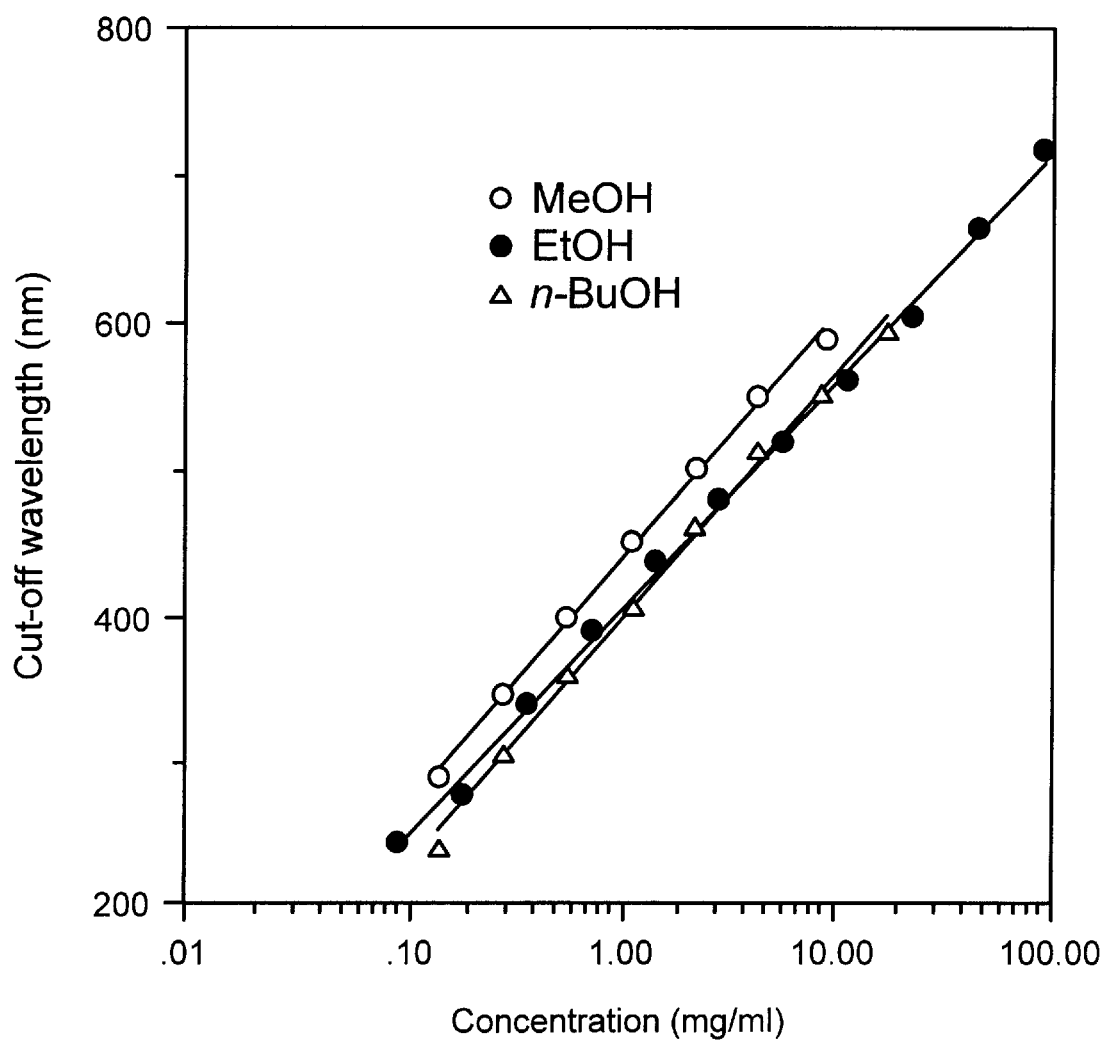
FIG. 6 is a plot showing the effect of concentration of the $C_{60}$-amine derivative in FIGS. 5(a) and (b) on the cut-off wavelengths in different solvents, FIGS. 7(a) and (b) are respectively transmission spectra of ethanol solutions of $H_xC_{60}[NH(CH_2)_3Si(OEt)_3]_x$ and $H_xC_{60}(NH\text{-cyclo-}C_6H_{11})_x$.

FIG. 6 shows that the cut-off wavelength also depends slightly on the solvent. FIG. 6 plots the cut-off wavelength against concentration for solutions of $H_xC_{60}[NH(CH_2)_6OH]_x$ in ethanol, methanol and n-butanol respectively. These differences may allow the transmission spectra of the aminated compound to be "fine-tuned". FIG. 6 also shows that $\lambda_c$-c follows a semilogarithmic relation and $\lambda_c$ increases linearly with $\log_{10}c$:

$$\lambda_c \alpha \log_{10}(bc) + k$$

where $\lambda_c$=cut-off wavelength at which light transmittance is 0.1% b=path-length of sample c=concentration of sample

α=constant k=constant

In addition to methanol, ethanol and n-butanol, this semilogarithmic relationship holds for other solvents as well. The experimentally obtained values of α and k for different solvents are summarised in Table 2:

TABLE 2

Solvatochromism in $H_xC_{60}[NH(CH_2)_6OH]_x$ [a]

| no. | Solvent | α[b] | k (nm)[b] |
|---|---|---|---|
| 1 | o-cresol | 197.5 | 420.8 |
| 2 | MeOH | 182.3 | 438.6 |
| 3 | n-PrOH | 170.5 | 438.9 |
| 4 | n-BuOH | 167.1 | 391.5 |
| 5 | DMSO | 166.6 | 432.9 |
| 6 | EtOH | 154.8 | 399.7 |
| 7 | m-cresol | 134.4 | 459.3 |

Figure 7A:
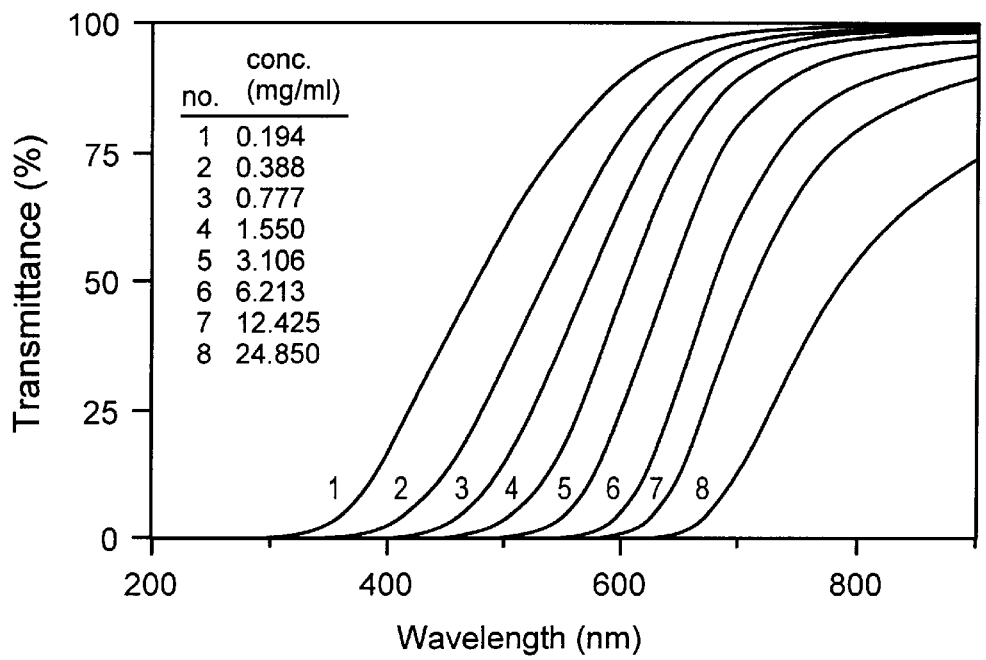
Figure 7B:
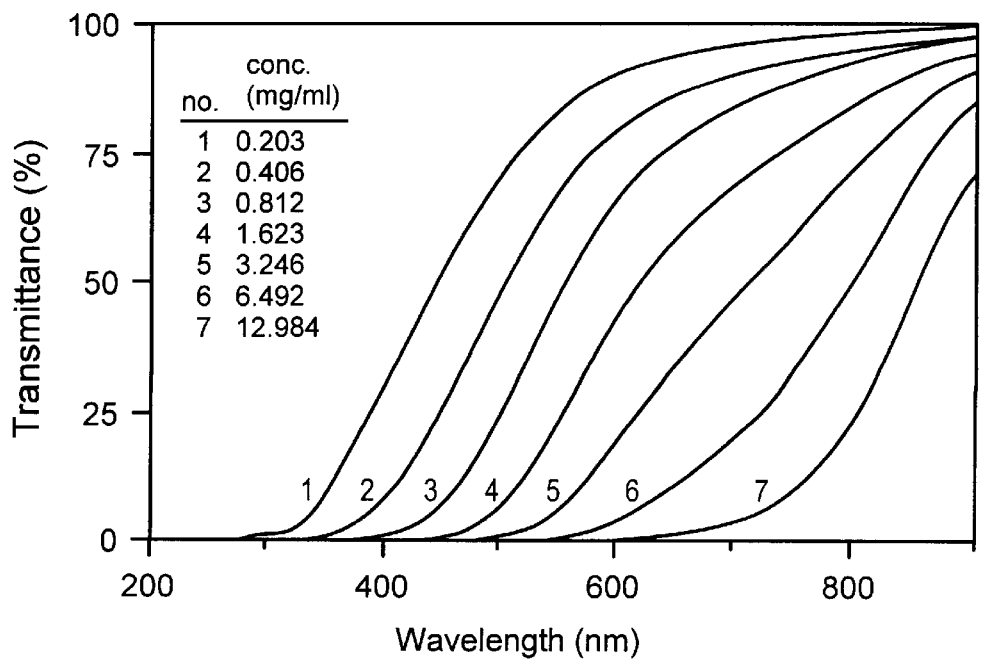
Figure 8:
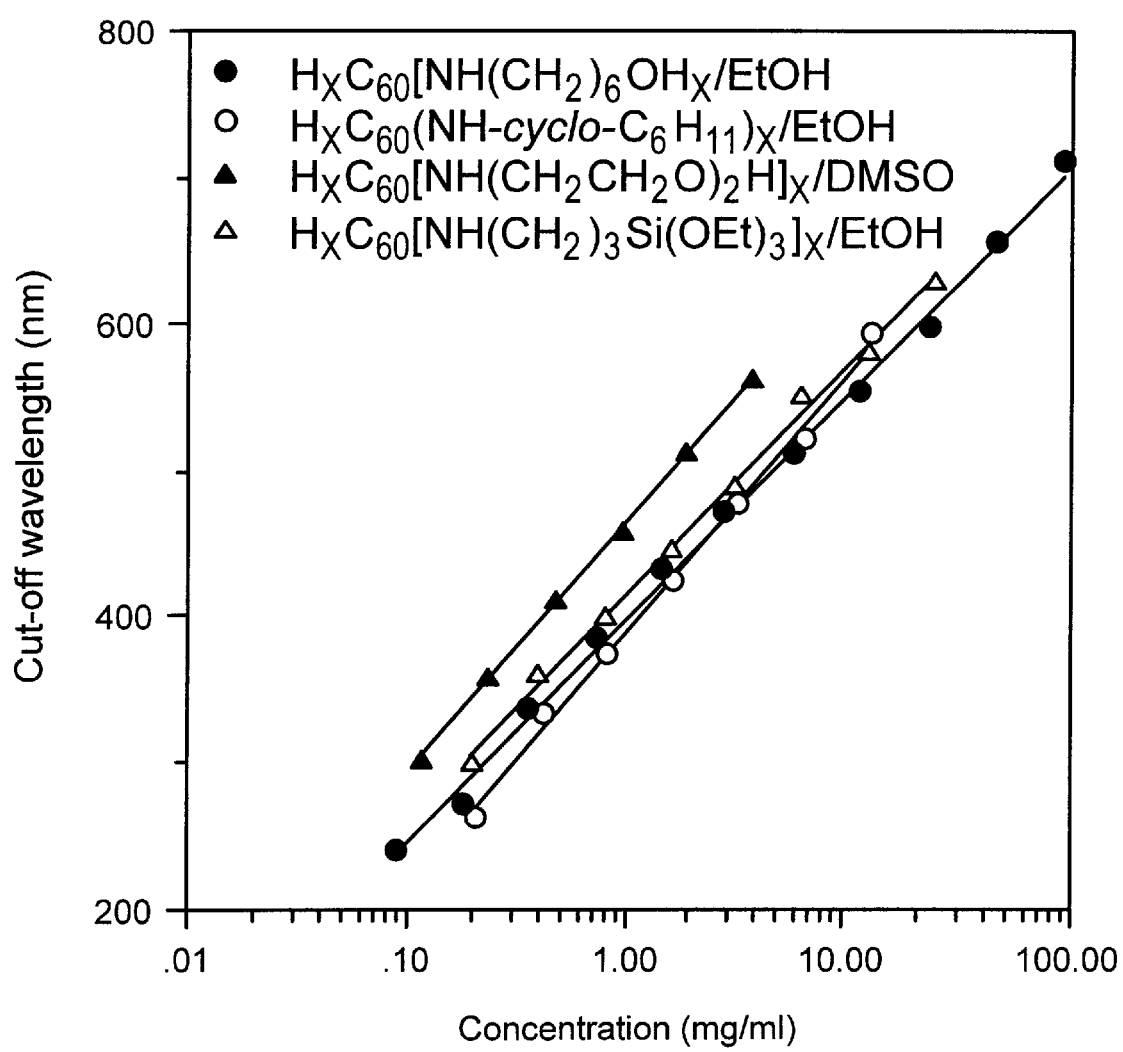
FIG. 8 shows the concentration dependence of the cut-off wavelength in various $H_xC_{60}(NHR)_x$ solutions.
Figure 9:
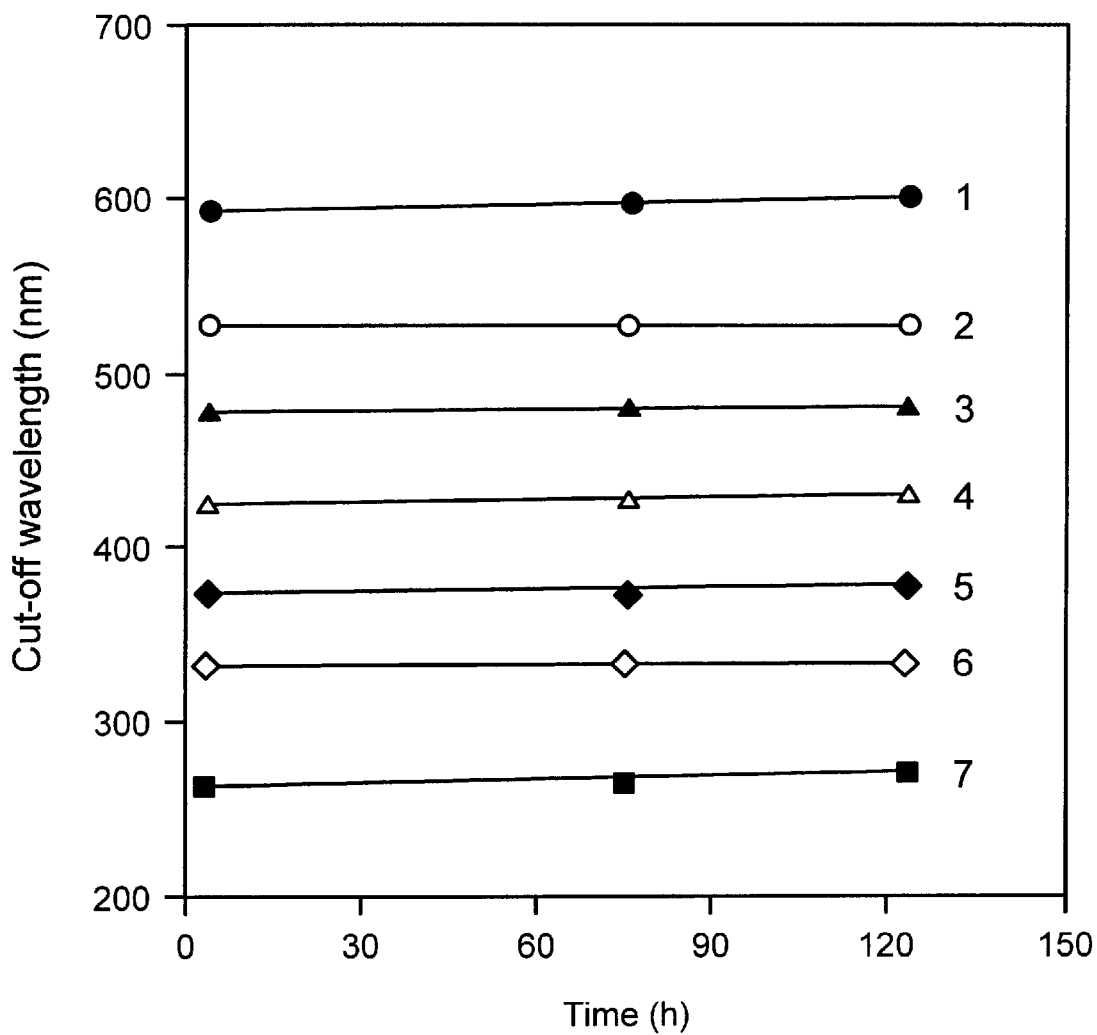
FIG. 9 shows the stability of the cut-off frequency over time.

[a] at room temperature, pathlength: 1 cm
[b] from $\lambda_c = \alpha\log(bc) + k$ FIGS. 7(*a*) and (*b*) show the transmission spectra for ethanol solutions of $H_xC_{60}[NH(CH_2)_3Si(OEt)_3]_x$ and $H_xC_{60}(NH$-cyclo-$C_6H_{11})$, respectively. It will be noted that these transmission spectra are very similar to FIG. 5. The curves are structureless at all concentrations and the cut-off wavelength shifts to higher values as the concentration increases. Furthermore $\lambda_c$-c plots for all $C_{60}$ derivatives show similar semilogarithmic relationships (see FIG. 8). In addition the cut-off frequencies are stable over time. FIG. 9 is a plot of cut-off wavelength against time for various solutions.

Figure 10:
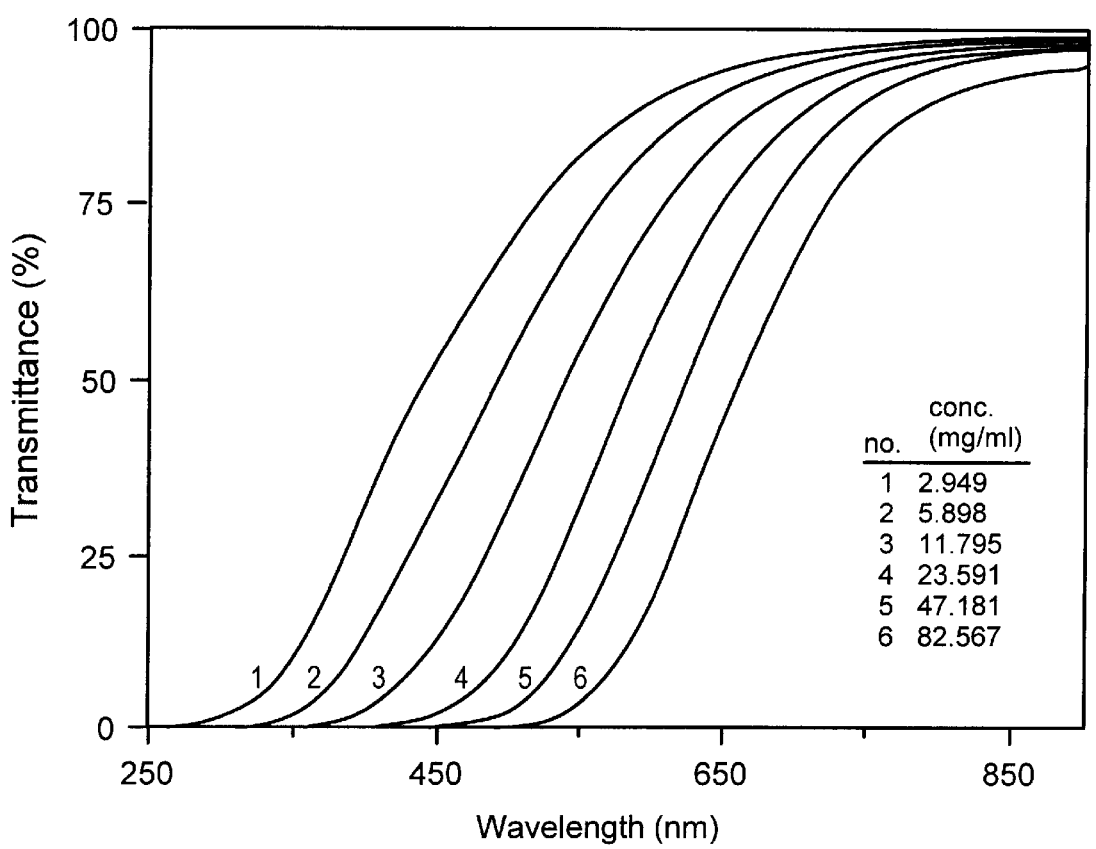
FIG. 10 shows the transmission spectra of poly($C_{60}$-co-MMA), FIGS. 11(a) and (b) show respectively the concentration dependence of the cut-off frequency in poly($C_{60}$-co-MMA) and poly($C_{60}$-co-styrene)

FIG. 10 shows the transmission spectra of THF solutions of poly($C_{60}$-co-MMA) ($C_{60}$ content 0.97 wt %) measured at room temperature using a 1 cm square quartz cell. The spectra are similar to those obtained for the aminated derivatives and similar results can be obtained for the other fullerenated polymers: $C_{60}$-PC, $C_{60}$-PVC, and $C_{60}$-PS.

Figure 11A:
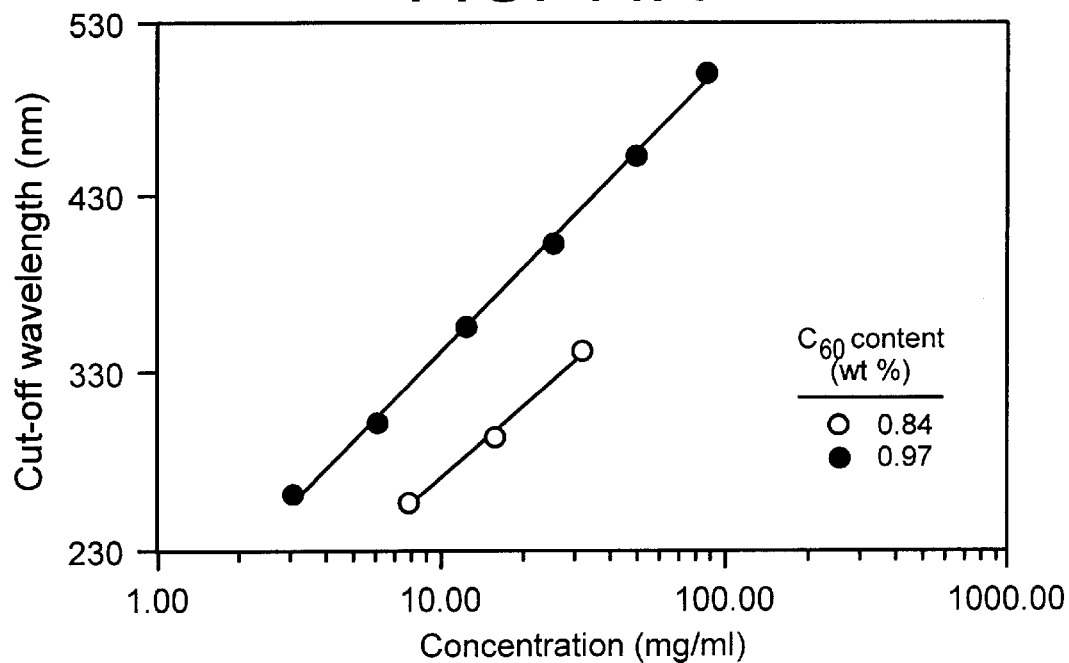
Figure 11B:
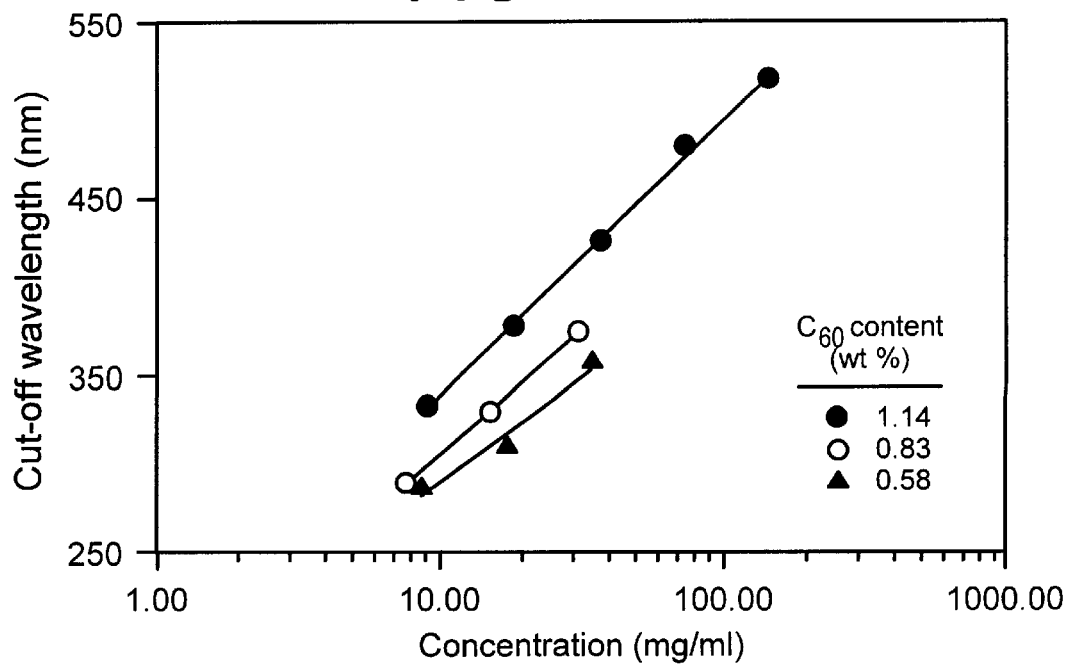
Figure 12A:
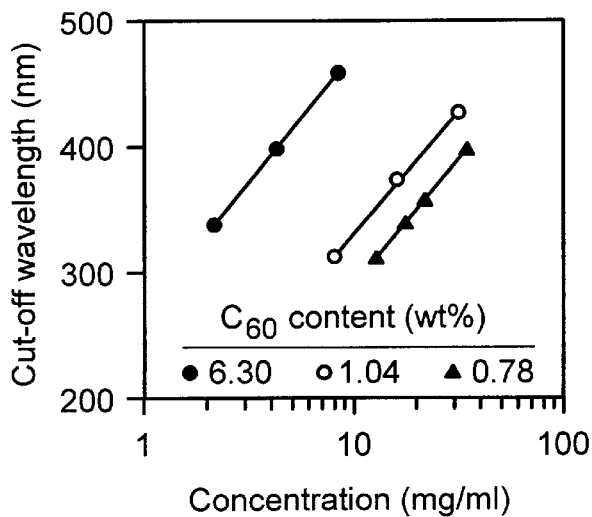
FIGS. 12(a)–(c) show respectively the concentration dependence of the cut-off frequency in $C_{60}$-containing polycarbonates prepared by (a) AIBN-induced, (b) UV-induced, and (c) $AlCl_3$-catalyzed fullerenations.
Figure 12B:
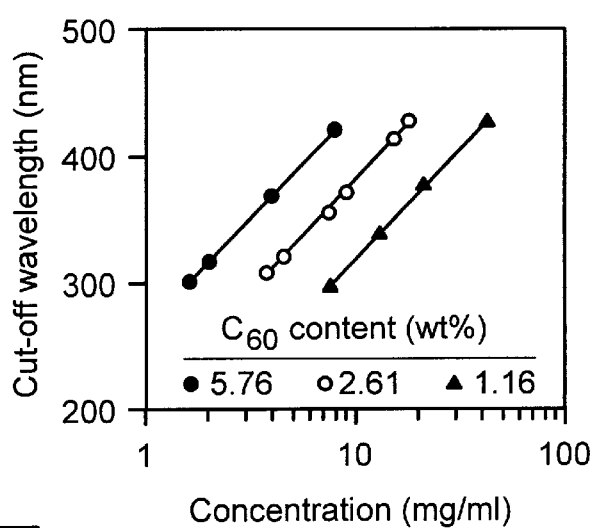
Figure 12C:
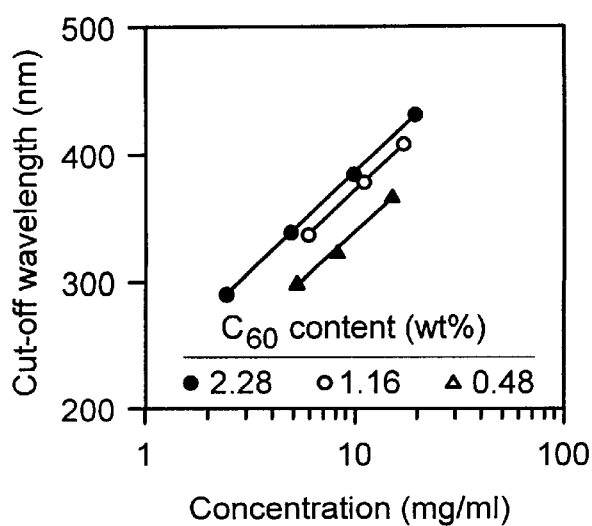
Figure 13:
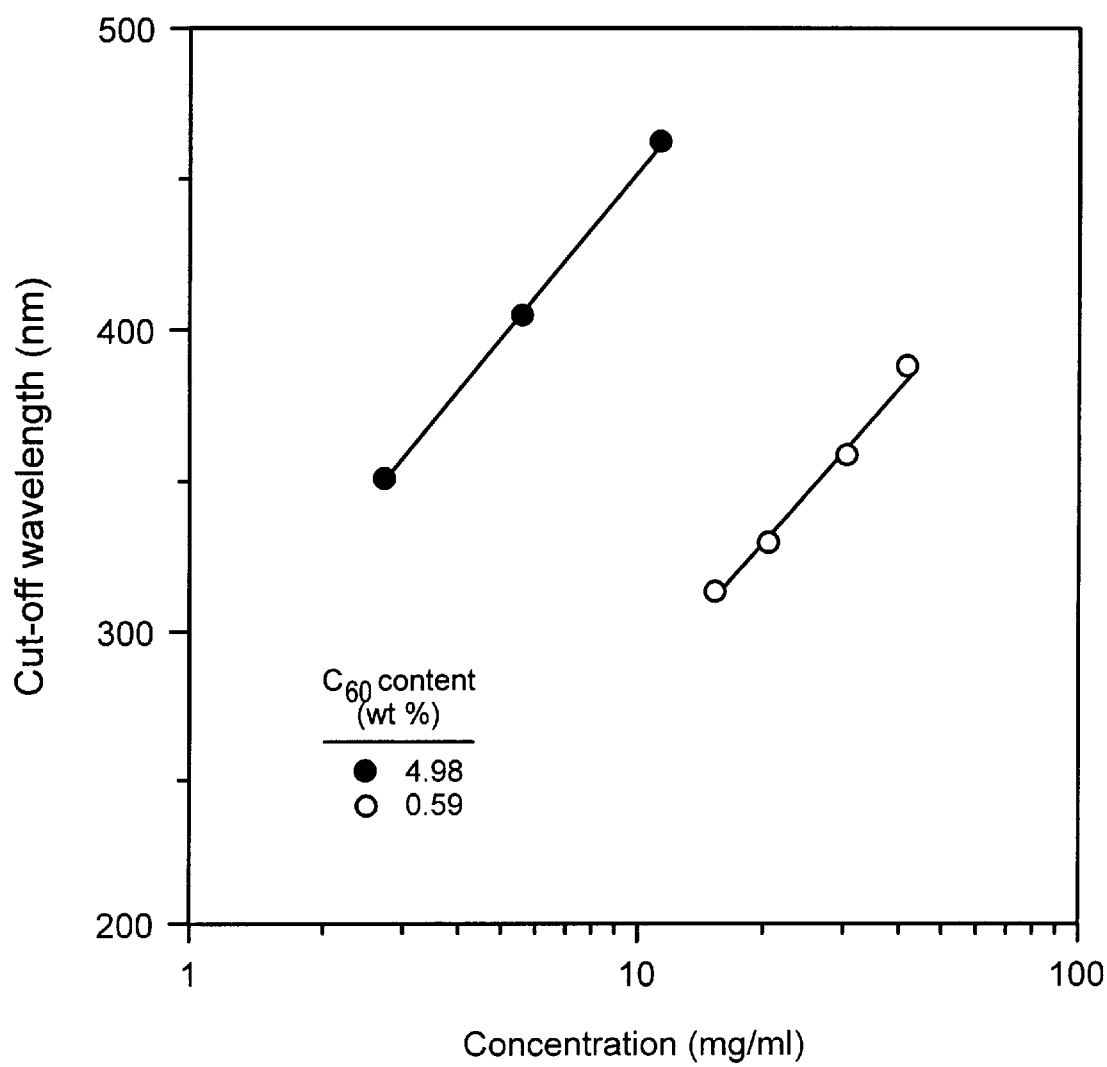
FIG. 13 shows the concentration dependence of the cut-off frequency in $C_{60}$-containing poly(vinyl chloride)s prepared by AIBN-induced fullerenation.

FIGS. 11(*a*) and (*b*) show the concentration dependence of the cut-off wavelength for poly($C_{60}$-co-MMA) and poly ($C_{60}$-co-styrene) respectively. FIGS. 11(*a*) and (*b*) show that these two polymers have the same semilogarithmic relationship as the previously discussed aminated derivatives. The semilogarithmic relationship also holds for $C_{60}$-containing polymers regardless of whether they are prepared by polymer reactions of $C_{60}$ with preformed polymers (FIGS. 12 and 13) or by copolymerization with appropriate monomers (FIGS. 11(*a*) and (*b*)).

Figure 14:
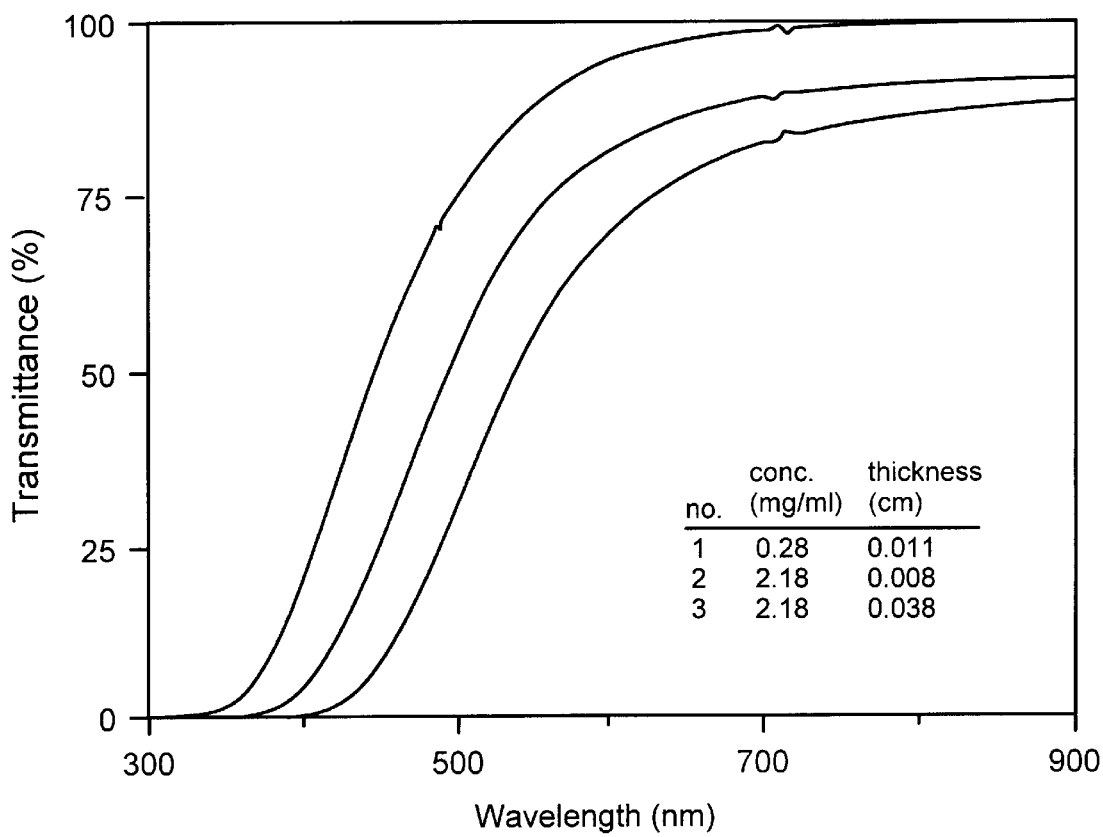
FIG. 14 shows the transmission spectra of $C_{60}$-CR-39 copolymer films.
Figure 15:
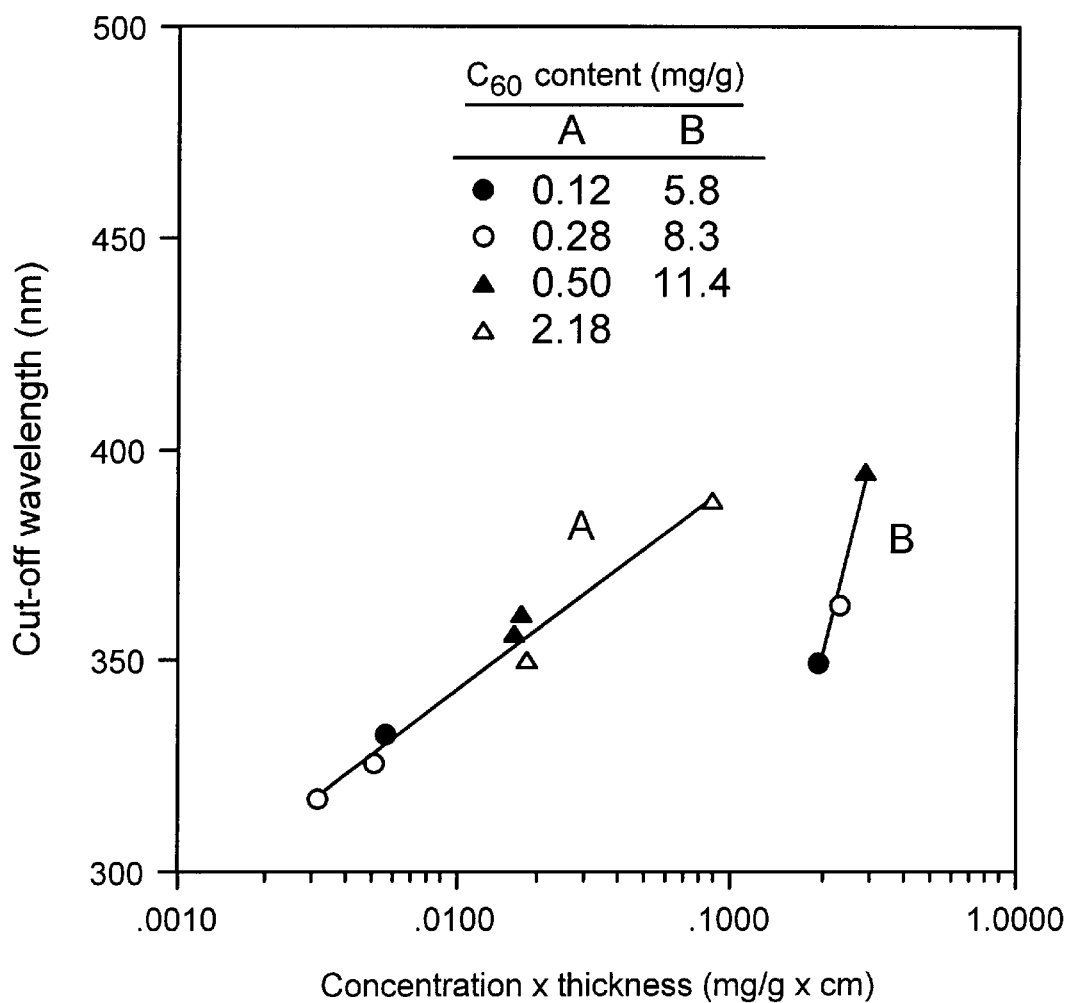
FIG. 15 shows the concentration and pathlength dependence of cut-off wavelength of $C_{60}$-CR-39 and $C_{60}$-styrene copolymer films.
Figure 16:
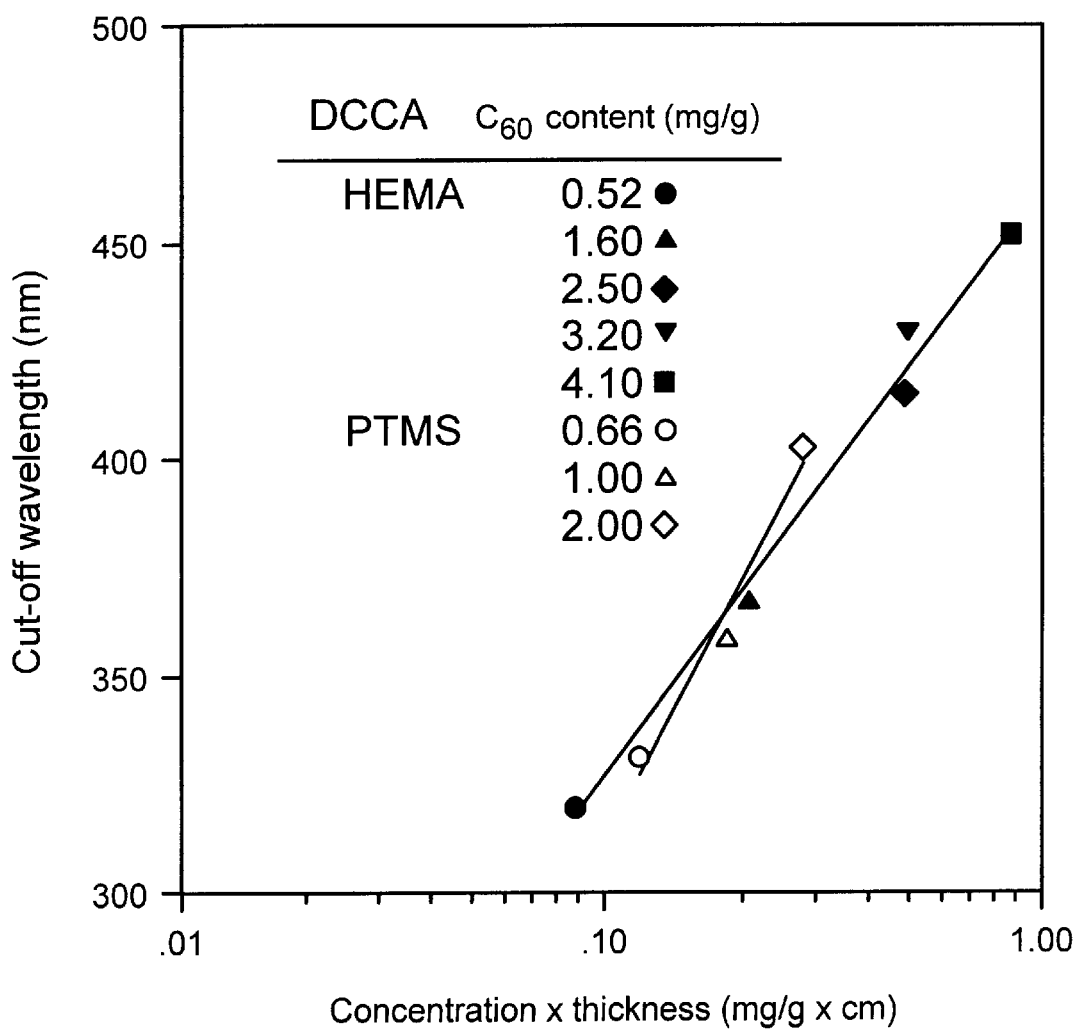
FIG. 16 shows the concentration and pathlength dependence of the cut-off wavelength of $H_xC_{60}[NH(CH_2)_3 SiO_{3/2}]\text{-}SiO_2$ sol-gel glasses prepared with various drying-control chemical additives, and FIGS. 17(a) and (b) show respectively the concentration dependence of the cut-off wavelength of $H_xC_{60}[NH(CH_2)_6 OH]_x/SiO_2$ and $H_xC_{60}(NH\text{-cyclo-}C_6H_{11})_x/SiO_2$ sol-gel glasses prepared with or without drying-control chemical additives.
Figure 17A:
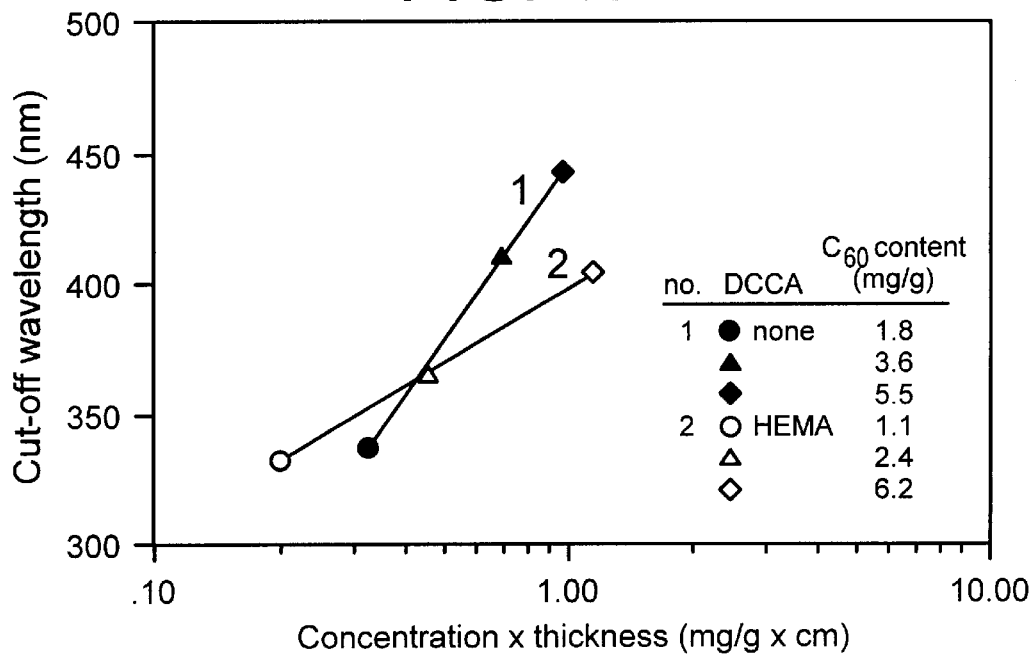
Figure 17B:
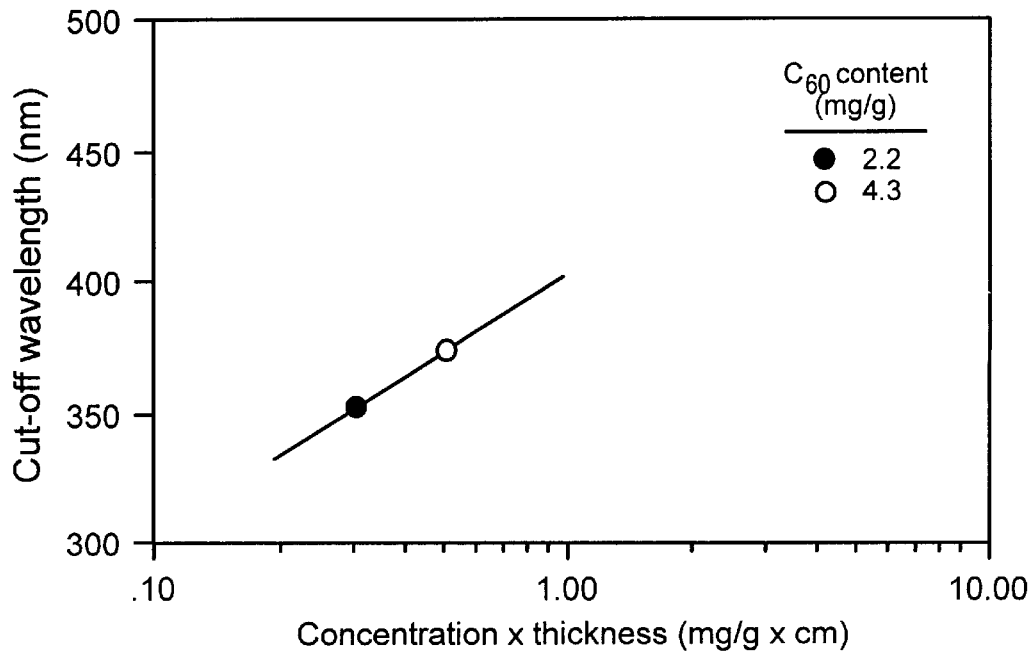

FIG. 14 shows the transmission spectra of $C_{60}$-CR-39 copolymer films, and again the same patterns can be seen as before. Once again a semilogarithimic dependency is found for the cut-off frequency with reagrd to concentration (once allowance has been made for the fact that in a membrane the thickness will be varying)—see FIG. 15. Again similar results are obtained with fullerene containing glasses prepared by the sol-gel manner described previously (FIGS. 16 and 17).

In summary the concentration dependence of the cut-off frequency means that the filtering properties of an optical material manufactured from such fullerene-containing materials can be easily controlled and adjusted by altering the concentration of the fullerene component. Since the fullerene materials are non-toxic they may be used as UV-protective contact lenses and skin cosmetics (eg creams and lotions). By simply changing the fullerene content the fullerene materials can completely block light in a wide spectral range while allowing high transmission of the light above specified wavelengths. Thus these materials may also be used in applications such as opthalmic lenses, optical filters for optical processing and communication, shielding screens for TV and PC monitors, sunglasses and protective goggles, containers, packaging materials and many others.

The above examples and embodiments are of course described by way of example and illustration only, since numerous modifications and variations will be apparent to those skilled in the art without departing from the spirit and scope of the invention.

We claim:

1. A homogeneous, transparent fullerene containing silicon glass that is suitable for use as an optical filtering material that is produced by the reaction of tetraethylorthosilicate (TEOS) and an animated fullerene derivative in an aqueous ethanol solution.

2. The homogeneous, transparent fullerene glass of claim 1, wherein the animated fullerene derivative that is reacted with TEOS is $H_xC_{60}[NH(CH_2)_6OH]_x$.

3. The homogeneous, transparent fullerene glass of claim 1, wherein said animated fullerene derivative is $H_xC_{60}[NH$-cyclo-$C_6H_{11}]_x$.

4. The homogeneous, transparent fullerene glass of claim 1, wherein said animated fullerene derivative is $H_xC_{60}[NH(CH_2CH_2O)_2H]_x$.

5. The homogeneous, transparent fullerene glass of claim 1, wherein said animated fullerene derivative is $H_xC_{60}[NH(CH_2)_3S:(OEt)_3]_x$.

6. The homogeneous, transparent fullerene glass of claim 1, wherein the fullerene content is at least about 0.55%.

7. The homogeneous, transparent fullerene glass of claim 1, which filters light differently based on the amount of fullerene contained therein.

* * * * *